(12) United States Patent
Baker et al.

(10) Patent No.: US 6,219,070 B1
(45) Date of Patent: Apr. 17, 2001

(54) SYSTEM AND METHOD FOR ADJUSTING PIXEL PARAMETERS BY SUBPIXEL POSITIONING

(75) Inventors: Nick Baker, Cupertino; Adam Malamy, Foster City; Adrian Sfarti, Sunnyvale; Paul Paternoster, Los Altos; Padma Parthasarathy, Fremont, all of CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/164,003

(22) Filed: Sep. 30, 1998

(51) Int. Cl.[7] .................................................. G06T 15/70
(52) U.S. Cl. ............................ 345/475; 345/441; 345/426
(58) Field of Search .................................. 345/441, 443, 345/475, 426

(56) References Cited

U.S. PATENT DOCUMENTS 5,684,510 * 11/1997 Brassell et al. ...................... 345/143
5,949,428 * 9/1999 Toelle et al. ......................... 345/431

\* cited by examiner

*Primary Examiner*—Cliff N. Vo
*Assistant Examiner*—Mano Padmanabhan
(74) *Attorney, Agent, or Firm*—Workman, Nydegger & Seeley

(57) ABSTRACT

A method and system for simulating motion of a polygon on a display screen. The polygon may be included in a set of polygons used to model a three-dimensional object. The position of the polygon is defined by vertices tracked in a subpixel coordinate system existing in a computer-readable medium. The subpixel coordinates of the vertices are used to identify the pixels on the display screen having coordinates that correspond to subpixel coordinates lying within or, optionally, at the boundary of the polygon. The identified pixels are those that are to be lighted on the display screen to generate the image of the polygon. The display properties of the lighted pixels are selected by interpolation based on defined pixel display parameters assigned to the vertices of the triangle. As motion of the polygon is tracked in the subpixel coordinate system, the corresponding display on the display screen is repeatedly adjusted. The method of identifying and interpolating the display parameters of the pixels using the subpixel coordinate system provides the appearance of smooth polygon motion.

14 Claims, 16 Drawing Sheets

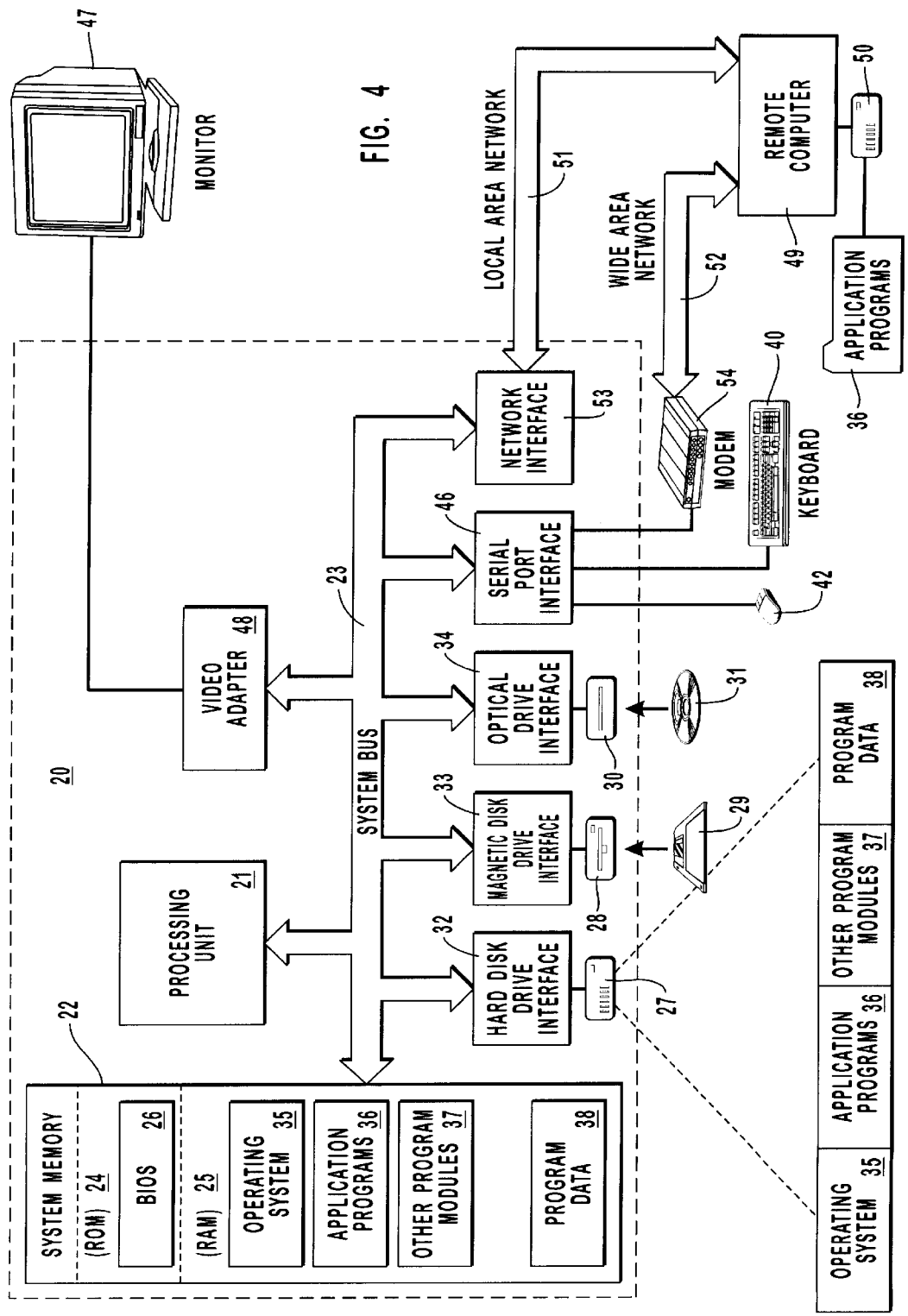

ated with one or more pixel display parameters that dictate the display properties of the pixels on the computer display screen when the vertices of triangle 100a are depicted thereon. In this example, vertices 102a, 104a, and 106a have a generic pixel display parameter of $d_1$, $d_2$, and $d_3$, respectively. Typically, vertices or other points to be displayed on a computer display screen have pixel display parameters of r, g, b (red, green, and blue color parameters), a (transparency or opacity parameter), and u, v, w (texture and depth parameters).

SYSTEM AND METHOD FOR ADJUSTING PIXEL PARAMETERS BY SUBPIXEL POSITIONING

BACKGROUND OF THE INVENTION

1. The Field of the Invention

The present invention relates to rendering graphical images having a three-dimensional appearance on a computer display screen. In particular, the present invention relates to systems and methods for displaying moving polygons on a computer display screen using a technique whereby the values of display parameters to be used with pixels on the display screen are repeatedly interpolated and adjusted to provide the appearance of smooth motion.

2. The Prior State of the Art

As computers have become more powerful and widely used during recent years, one application of computers that has become increasingly valuable is the rendition of objects on computer display screens. Displaying images of objects on computer display screens has been used in computer-aided design and manufacture, computer modeling of objects, the internet, computer games, and many other areas. One particularly valuable technique of displaying objects involves generating an image that is perceived by the human eye as having depth and other three-dimensional features.

A known method for graphically modeling an object in preparation for displaying a three-dimensional image of the object involves approximating the curvature of the object with a series of adjacent polygons whose vertices lay on the object's surface. For example, FIG. 1 illustrates a simple object that is modeled by arraying a series of polygons on the surface thereof. Object 10 has been divided into a set of triangles (including triangles 12, 14, 16, 17, 18, and 19) in accordance with this technique. The coordinates of the vertices of the triangles and other polygons may be stored in a computer-readable medium so that a computer may display the image of object 10, with the option of manipulating the coordinates to simulate motion or other dynamic modeling of the object. Prior to being rendered on a flat display, these triangles and other polygons of FIG. 1 are typically projected into a two-dimensional perspective, since the pixels of computer display screens exist in two dimensions Methods of displaying polygons or other objects on a display screen typically involve the use of computer-executable code that interprets the vertex coordinate information stored in the computer-readable medium or other information defining the object and transforms the information into signals causing appropriate pixels on a display screen to be lighted Conventional methods of simulating motion of an object, such as object 10 of FIG. 1, have limitations that frequently give the object a jumping and non-continuous appearance. The limitations of such methods can be understood in reference to FIGS. 2a–2b and 3a–3e, which illustrate an example of displaying motion of a triangle on a computer display screen. FIG. 2a illustrates triangle 100a as defined in a coordinate system existing on a computer-readable medium at a selected point in time. The coordinate system has integer values that correspond to pixels on the computer display screen on which triangle 100a is to be displayed. At this instant depicted in FIG. 2a, triangle 100a has vertex 102a at (2.00, 0.25), vertex 104a at (4.00, 3.25), and vertex 106a at (5.00, 1.75). When triangle 100a is modeled in three dimensions, there will also be a z-coordinate value for each vertex, but for purposes of clarity, the z-coordinate values are not identified herein. Moreover, each vertex is associ- FIG. 2b further illustrates triangle 100a having been subjected to lateral motion over time. During selected increments of time, triangle 100a has been successively transformed in the computer-readable medium to triangles 100b, 100c, and 100d. The motion of triangle 100a to triangle 100b has been generated by incrementing the y-coordinate of each vertex by 0.25. Likewise triangles 100c and 100d have been defined in the computer-readable medium by incrementing the y-coordinates of the vertices of the preceding triangles by 0.25.

FIGS. 3a–3e illustrate a conventional method by which the successive triangles 100a–100d of FIG. 2b are displayed on a computer display screen 210. Because display screen 210 has pixels only at positions that correspond to integer coordinates of the coordinate system of FIGS. 2a and 2b, the coordinates of the vertices of triangles 100a–100d are rounded to the nearest integer. In this manner, the vertices are "snapped" into the integer pixel positions of FIGS. 3a–3e. In addition, the pixel display parameters $d_1$, $d_2$, and $d_3$, are mapped directly to the pixels to which the associated vertices are snapped.

In FIG. 3a, vertex 102a (2.00, 0.25) has been snapped to pixel 202a having pixel coordinates of (2, 0). In addition, pixel 202a has a display property $d_1$ that directly corresponds to pixel display parameter $d_1$ of vertex 102a. It is noted that snapping vertex 102a to pixel 202a sacrifices some resolution, since the precise y-coordinate value 0.25 of vertex 102a is rounded to a y-coordinate 0 of pixel 202a However, since the pixels exist only at integer coordinates, some loss of static resolution is unavoidable. Pixels 204a and 206a are also lighted in the same way as pixel 202a. In addition, the computer-executable code that enables the display of triangle 100a may identify and light the pixels 208a that are bounded by line segments connecting pixels 202a, 204a, and 206a. In this manner, triangle 100a is displayed on display screen 210, albeit with some loss of resolution.

FIGS. 3b–3e further illustrate display screen 210 on which triangles 100b–100d, respectively, are rendered. The method for selecting the identity and the display properties of the pixels are the same as that described in reference to FIG. 3a. It is noted that the pixel displays 220a–220c of FIGS. 3a–3c, which correspond to triangles 100a–100c, are identical. Although the precise coordinates of the vertices of triangles 100a–100c have changed over time, the identity and the display properties of the corresponding pixels at the integer positions of display screen 210 are completely unchanged. It is further noted that pixel display 220d of FIG. 3d, which corresponds to triangle 100d, has undergone significant change when compared to the previous pixel display 220c of FIG. 3c.

These observations are illustrated in FIG. 3e, which shows a composite of pixel displays 220a–220d. As triangles 100a–100d undergo relatively smooth motion in the computer-readable medium, the corresponding pixels of pixel displays 220a–220d are not adjusted in any way except for undergoing an abrupt, integer pixel jump between display 220c of FIGS. 3c and display 220d of FIG. 3d. When many such triangles or other polygons are combined to model an object in three dimensions, the resulting jumping motion can be noticeable and distracting to the viewer. However, as illustrated in the foregoing example, the prior art methods of simulating motion of a polygon have no way of minimizing the effects of such jumping motion between integer pixel positions.

In view of the foregoing, there is a need in the art for systems and methods for rendering a moving image of a polygon that reduces the jumpiness that has been experienced according to the prior art techniques. In particular, it would be an advancement to provide systems and methods for rendering the moving polygons in such a way that the integer jumps between pixels are masked and the appearance of motion is smoother than has been previously possible.

SUMMARY AND OBJECTS OF THE INVENTION

The present invention is directed to systems and methods for simulating motion of a polygon on a computer display screen. The polygon is represented on the display screen at an instant in time screen by lighting appropriate pixels on the display screen. In order to simulate motion of the polygon over time, at least two techniques are combined to generate the appearance of smoother motion than has been possible using prior art methods. First, the appropriate individual pixels at integer coordinate positions on the display screen are selected, lighted, and turned off. Second, individual pixels on the display screen are assigned display properties that vary with respect to time. Thus, motion is simulated not only by shifting the polygon across the display screen by successively lighting and turning off pixels, but also by varying the pixels' display properties, such as texture and color, over time. While pixels on the display screen remain unavoidably located at integer positions, the technique of repeatedly adjusting the display properties of the pixels according to the invention provides the appearance of significantly smoother motion than is possible using prior art methods.

The method of adjusting the display properties of the pixels to contribute to the appearance of motion of the polygon is accomplished by tracking, in a subpixel coordinate system existing in a computer-readable medium, vertex information specifying the location of the vertices of the polygon over time. The subpixel coordinate system has a resolution greater than the pixel coordinate system of the display screen. Computer-executable instructions are applied to the vertex information in order to perform at least two functions. First, the computer-executable instructions identify the points in the subpixel coordinate system that both lie within the polygon and correspond to integer pixel locations on the display screen. Second, the computer-executable instructions interpolate the pixel display parameters that are to be associated with the identified points. The interpolation method may include identifying appropriate pixel display parameters for the identified point with respect to defined pixel display parameters at the vertices of the polygon.

Compared to the methods of the prior art, the invention renders motion of polygons that has a significantly smoother appearance. As seen in FIGS. 2a, 2b and 3a–3e, the vertices of the polygons are snapped to the nearest integer pixel positions according to the prior art. Furthermore, according to the prior art, the pixels to which the vertices are snapped are assigned the pixel display parameters associated with the vertices. Accordingly, the identity and the display properties of the pixels lighted in the prior art methods are not adjusted by interpolation or any other technique. As a result, the rendered polygon merely jumps from one integer pixel location to another with no intermediate system for adjusting or modifying the display to further simulate smooth motion. In contrast, the methods of the invention, enabled by the subpixel coordinate system, repeatedly adjust the identity and/or the display properties of the pixels as the polygon moves across the display screen.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 is a schematic view illustrating a computer system capable of supporting selected embodiments of the invention.

DETAILED DESCRIPTION OF THE PREFERRED EMBODIMENTS

Figure 1:
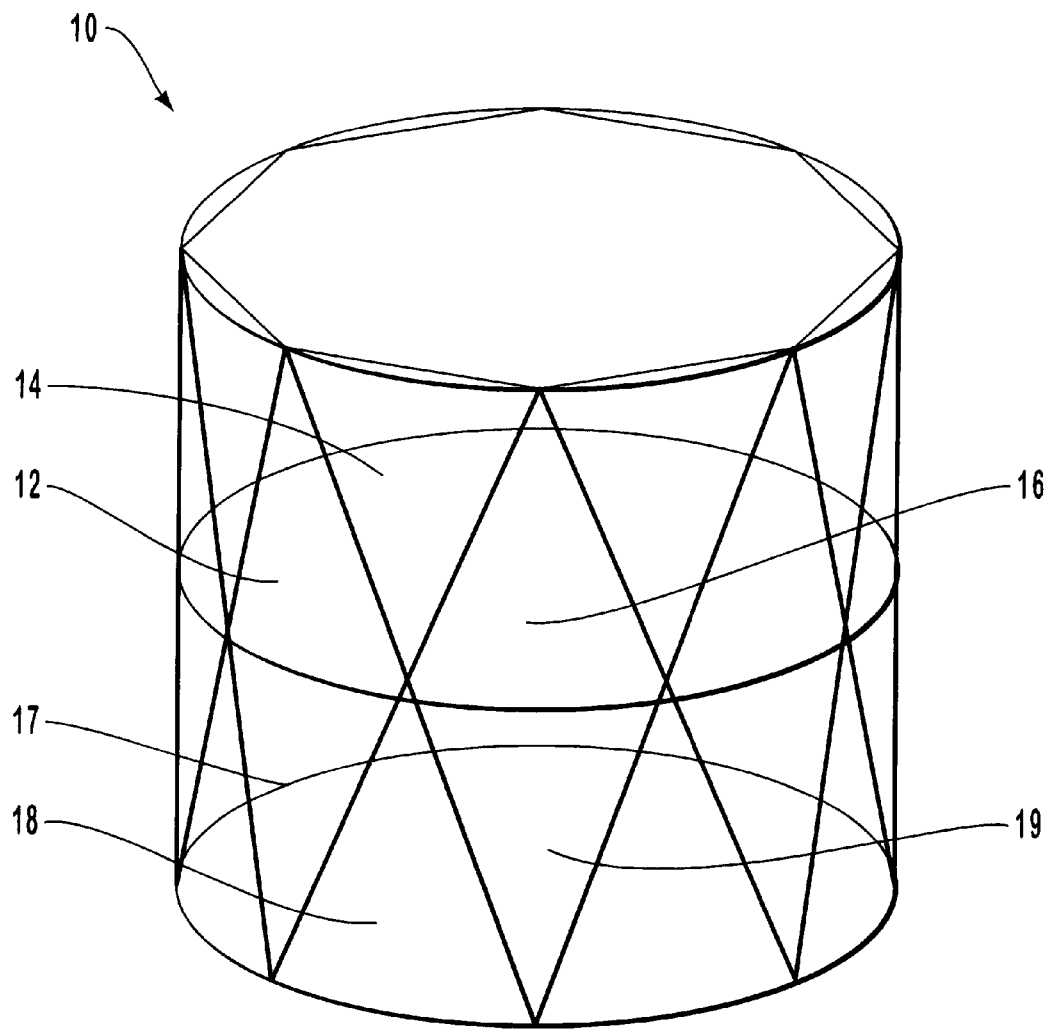
FIG. 1 shows a known technique for graphically representing an object using a set of polygons.
Figure 2A:
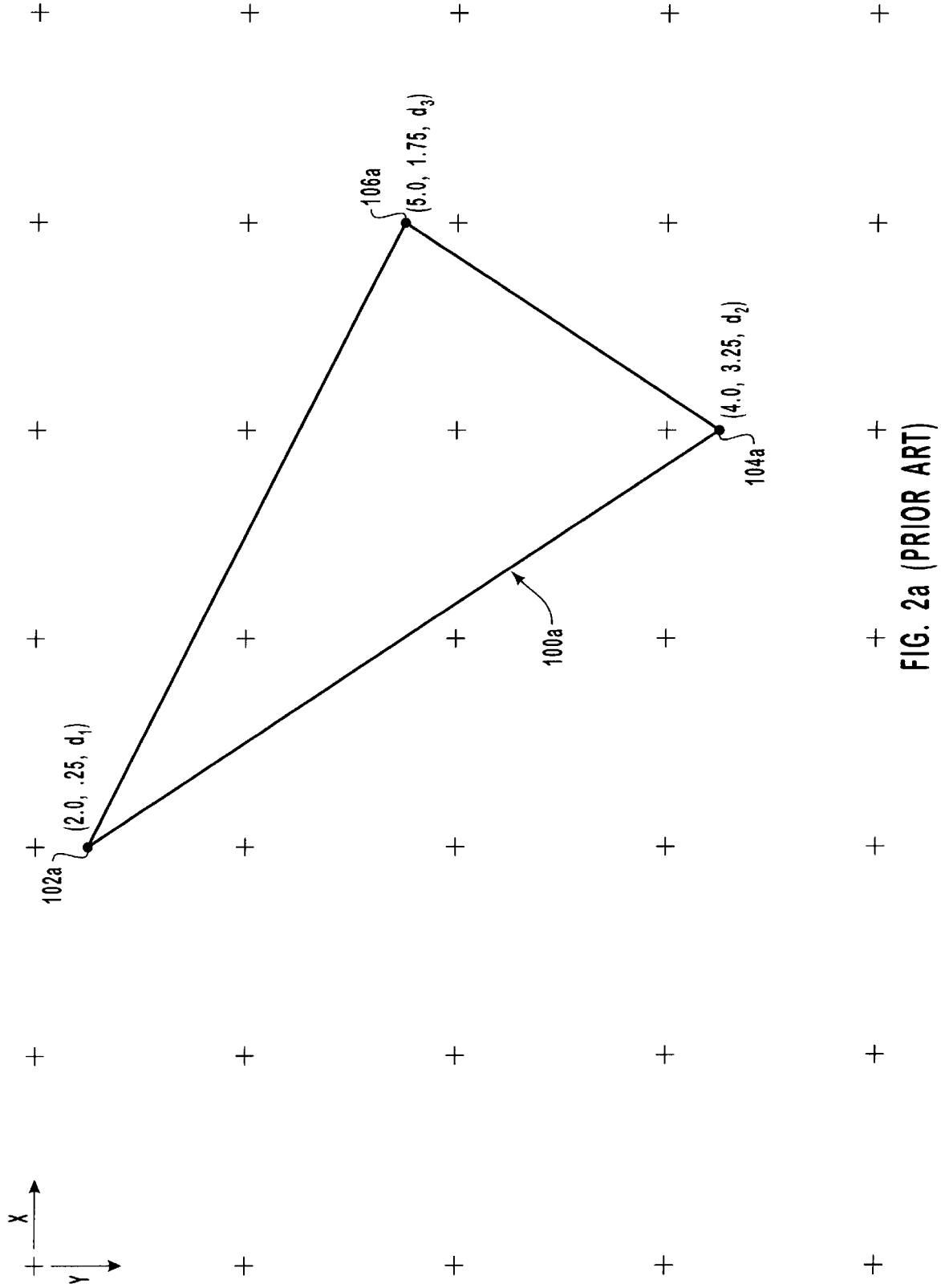
FIG. 2a illustrates a technique in the prior art wherein a polygon that represents a portion of an object to be rendered on a display screen is defined by three vertices positioned in a pixel coordinate system existing in a computer-readable medium.
Figure 2B:
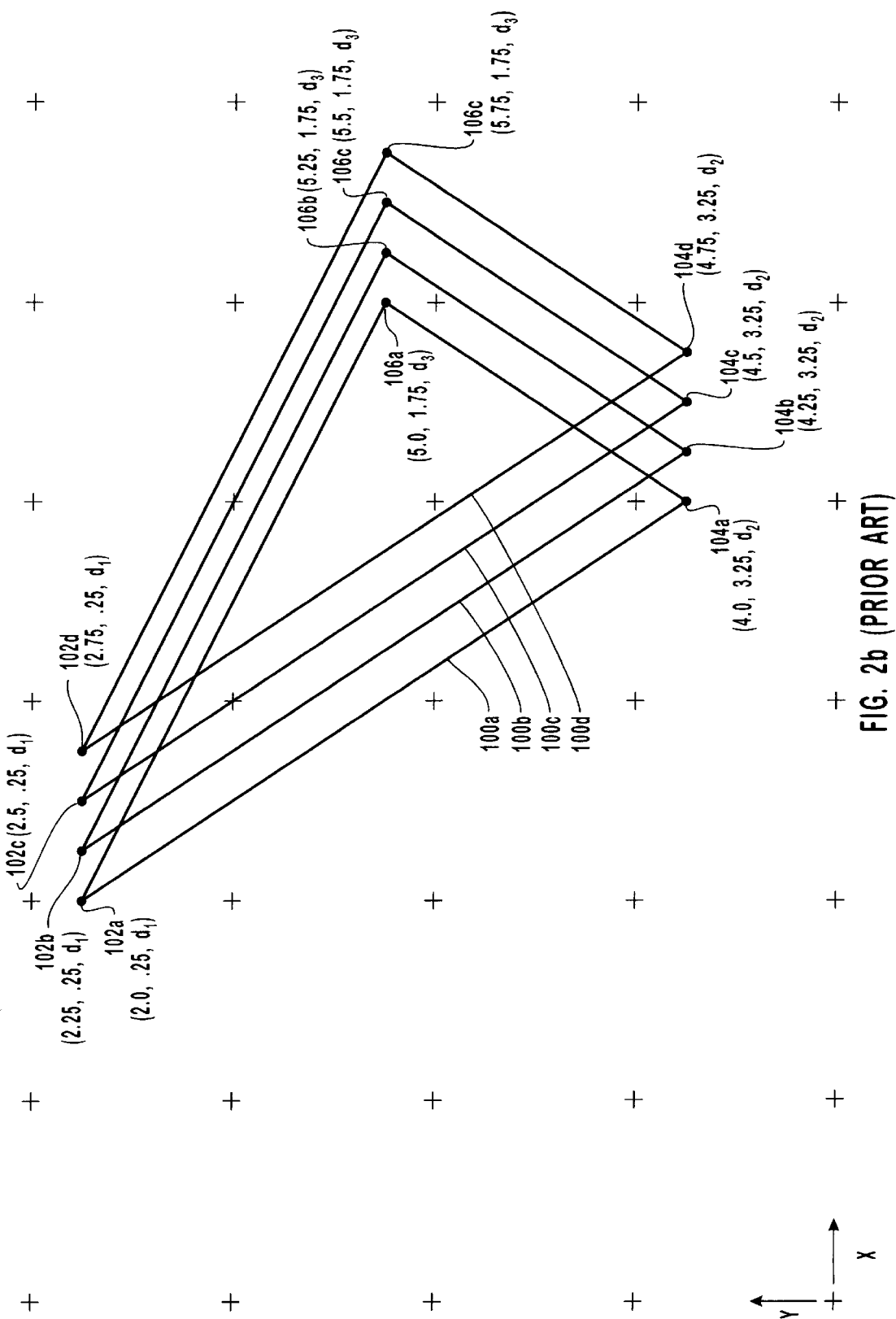
FIG. 2b, which further illustrates the prior art technique of FIG. 2a, depicts a series of polygons positioned in the pixel coordinate system and represent motion of the polygon of FIG. 2a during a specified interval of time.
Figure 3A:
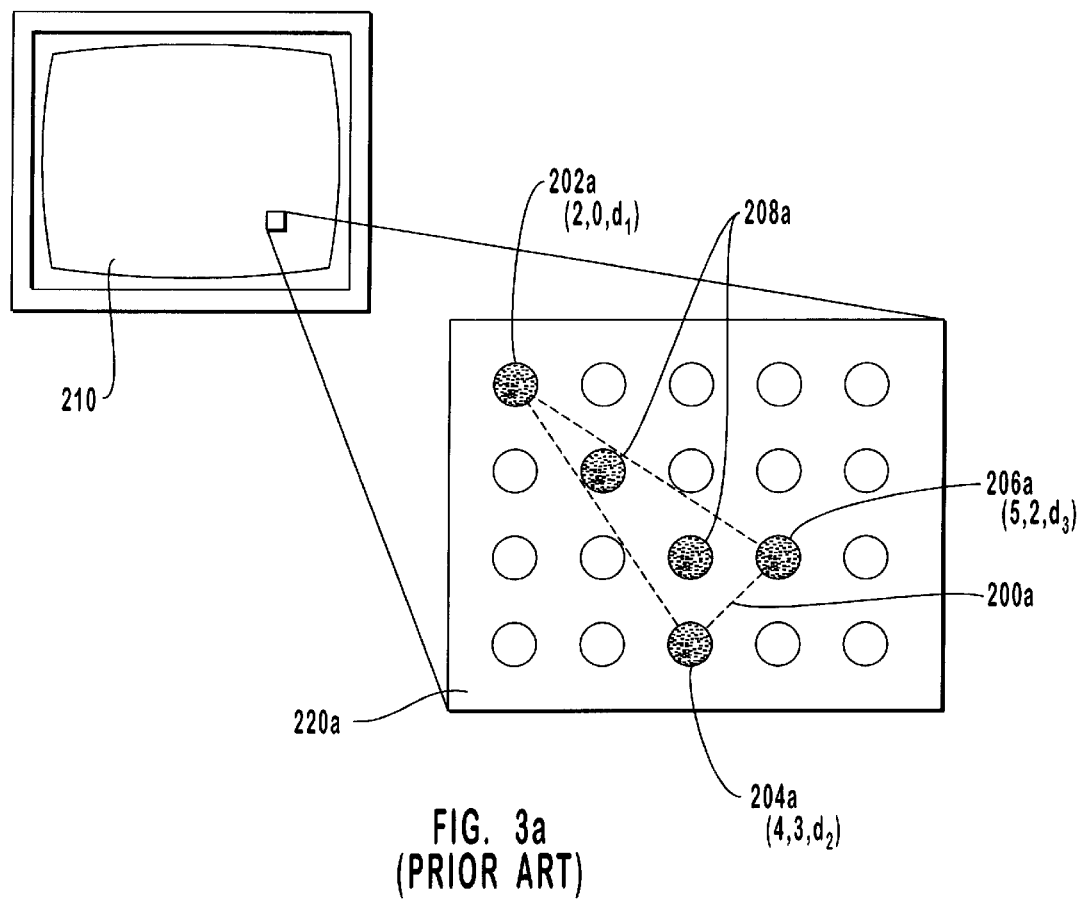
FIGS. 3a–3d illustrate the display of the polygons of FIG. 2b according to the prior art technique, wherein the vertices of the polygons are snapped to the nearest integer pixel position on the display screen.
Figure 3B:
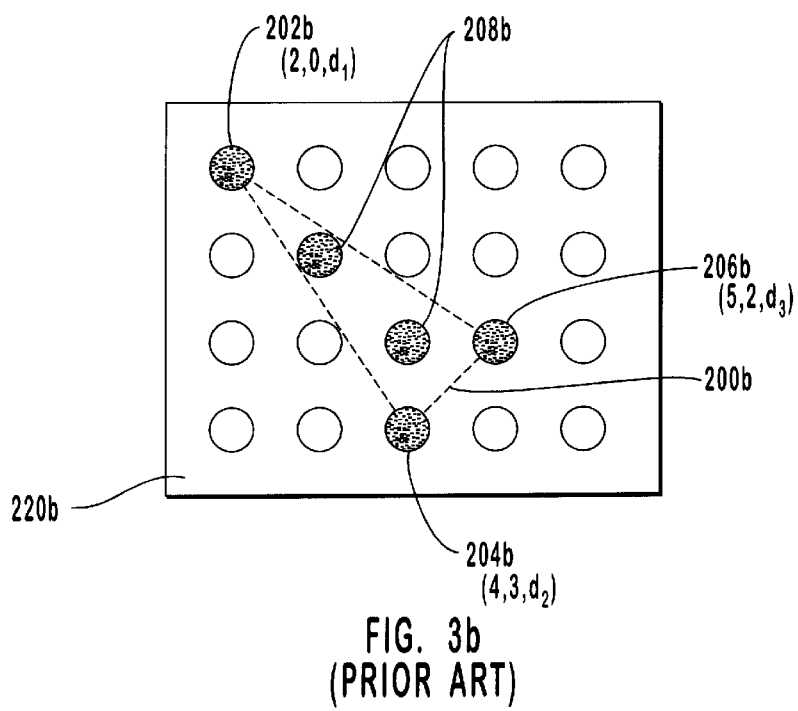
Figure 3C:
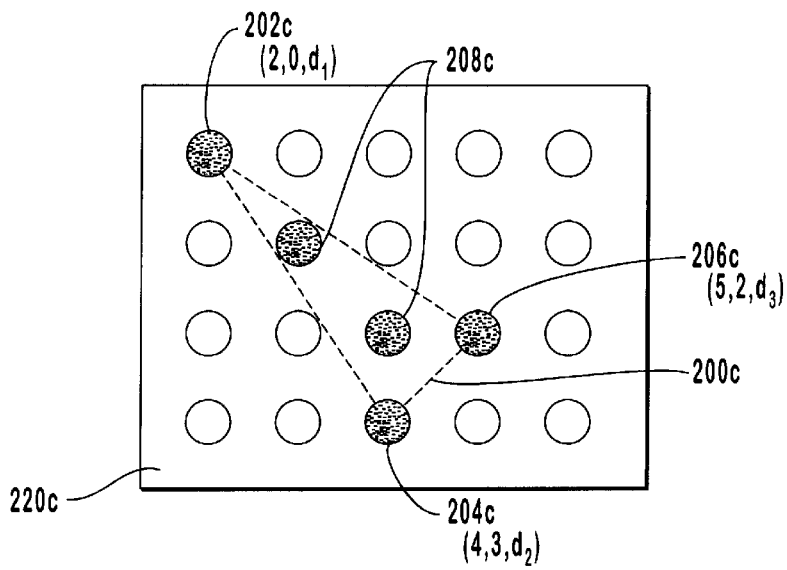
Figure 3D:
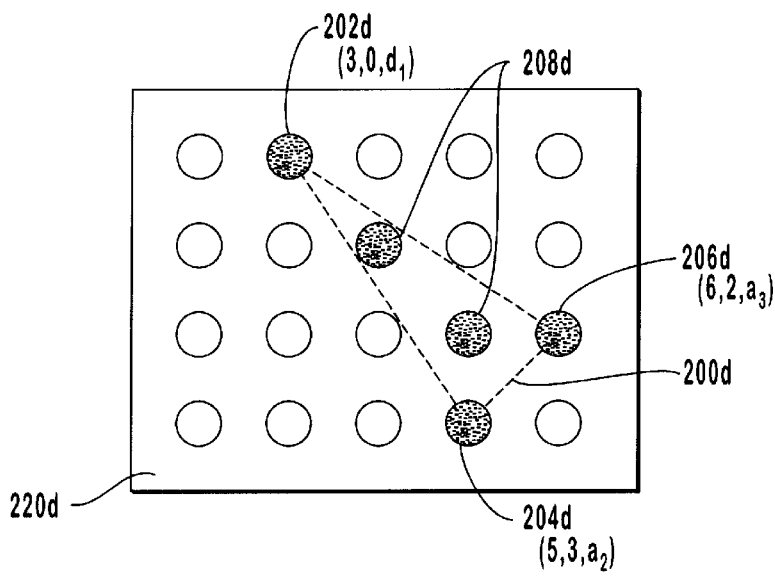
Figure 3E:
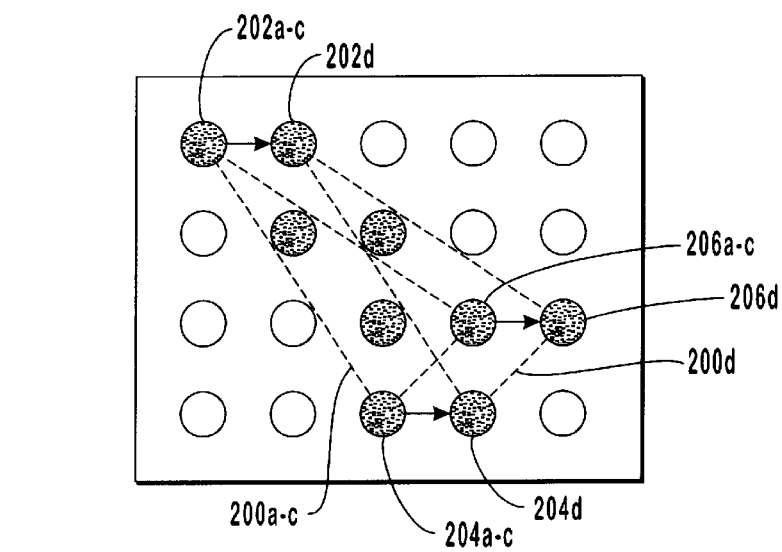
FIG. 3e is a composite view of the displayed polygons of FIGS. 3a–3d, further illustrating the manner in which the polygon display abruptly jumps from one integer pixel position to another.

The present invention is directed to systems and methods for simulating motion of a polygon on a computer display screen. The polygon is represented on the display screen at an instant in time by lighting appropriate pixels on the display screen. The position of the polygon is tracked in a subpixel coordinate system existing in a computer-readable medium. The subpixel coordinate system allows the appropriate pixels and their display properties to be selected in order to generate the appearance of smooth motion of the polygon. First, computer-executable instructions executed by a computer identify the pixels of the display screen having coordinates that lie within or at the boundary of the polygon. The identified pixels are those that are to be lighted to render the image of the polygon. Second, the display properties (i.e., texture, color) of the identified pixels are interpolated based on the defined pixel display parameters of the vertices of the polygon. As the polygon undergoes motion in the subpixel coordinate system, the identity and the display properties are repeatedly adjusted thereby updating the graphical image on the display screen. Accordingly, the invention permits motion of the polygon to be rendered more smoothly than has been possible using previous techniques, in which the vertices of the polygon are merely "snapped" to the nearest integer pixel position.

Certain embodiments within the scope of the present invention include computer-readable media having executable instructions or data fields stored thereon. Such computer-readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Executable instructions comprise, for example, instructions and data which cause a general purpose computer, special purpose computer, or special purpose processing device to perform a certain function or group of functions. The computer-executable instructions and associated data fields represent an example of program code means for executing the steps of the invention disclosed herein.

FIG. 4 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, computer game consoles and the like. The invention may also be practiced in distributed computing environments where tasks are performed by remote processing devices that are linked through a communications network. In a distributed computing environment, program modules may be located in both local and remote memory storage devices.

With reference to FIG. 4, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24.

The computer 20 may also include a magnetic hard disk drive 27 for reading from and writing to a magnetic hard disk (not shown) a magnetic disk drive 28 for reading from or writing to a removable magnetic disk 29, and an optical disk drive 30 for reading from or writing to removable optical disk 31 such as a CD-ROM or other optical media The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 4. The logical connections depicted in FIG. 4 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 5:
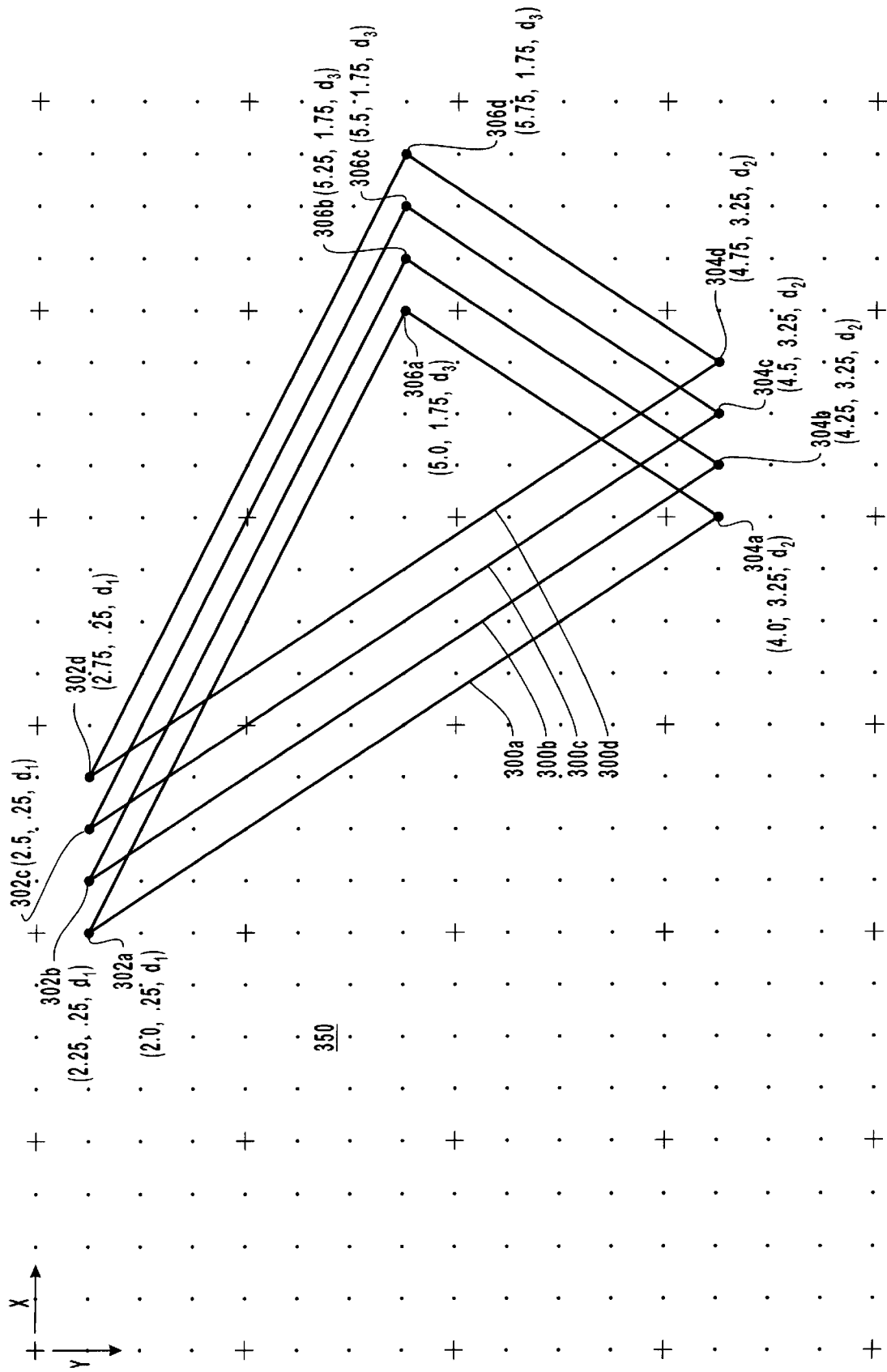
FIG. 5 illustrates a series of polygons according to the invention, wherein the polygons are positioned in a subpixel coordinate system existing in a computer-readable medium.
Figure 6B:
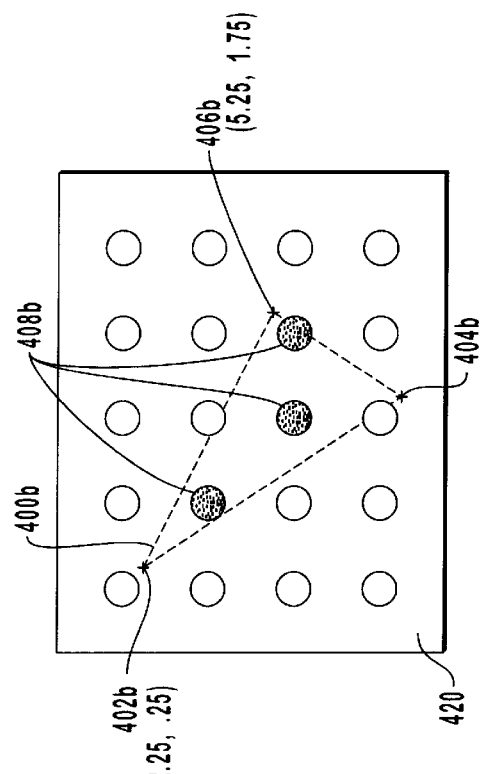
FIGS. 6a–6d depict the polygons of FIG. 5 successively displayed on a display screen generated according to the invention. The identity and the display parameters of the pixels that are lighted on the display screen to generate the displays of FIGS. 6a–6d are selected according to the methods described herein.
Figure 6D:
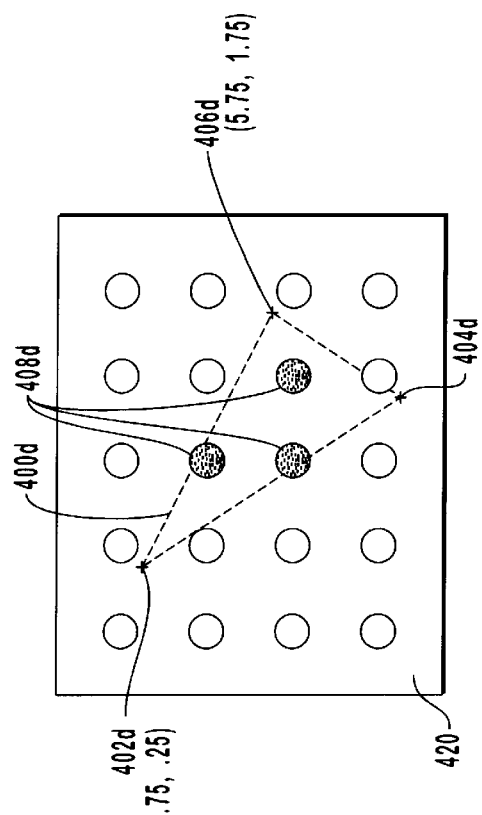

FIGS. 5 and 6a–6d illustrate the general principles of the invention and a broad example of a method whereby motion of a polygon is smoothly rendered on a display screen. FIG. 7 illustrates program modules and hardware elements of a system for generating an image of a moving polygon according to the invention. Finally, FIGS. 8–13 depict a specific example that discloses one computational method that may be advantageously used as part of the inventive method to identify the pixels to be lighted on the display screen and to interpolate the display parameters of the identified pixels.

The general features and functions of the invention can be understood by observing the manner in which the position of a polygon is displayed on a display screen as illustrated in FIGS. 5 and 6a–6d. In particular, FIG. 5 illustrates four successive positions of a polygon in a subpixel coordinate system existing in a computer-readable medium. The coordinate system is "subpixel" in the sense that it has a higher resolution than the corresponding coordinate system of a computer display screen on which the polygon is to be displayed. For convenience, the coordinate values of the subpixel coordinate system may be multiples of the corresponding pixel coordinates on the display screen. However, for purposes of illustration, the subpixel coordinate values are defined to be equal to the corresponding pixel coordinates in the example of FIGS. 5 and 6a–6d.

It is also noted that the polygon or polygons whose motion is to be rendered according to the invention may be selected using any desired method. For example, the polygons to be displayed using the present invention can be selected according to conventional methods to model a three dimensional object, such as the one illustrated in FIG. 1.

In the first position, polygon 300a has vertices 302a, 304a, and 306a having subpixel coordinates of (2.00, 0.25), (4.00, 3.25), and (5.00, 1.75), respectively. The vertices in this and other examples may further have a z-coordinate value. For purposes of clarity, motion of the polygons in the following examples is illustrated only in two dimensions. However, those skilled in the art will understand that the principles disclosed herein extend to three-dimensional coordinate systems. Moreover, the x and y axes are shown in the accompanying drawings according to convention, and any other coordinate system may be used.

Polygon 300a undergoes motion that is tracked in the subpixel coordinate system existing in the computer-readable medium. In this example, during successive periods of time, each vertex shifts 0.25 units in the y-direction. In particular, polygon 300b has vertices 302b (2.00, 0.50), 304b (4.00, 3.50), and 306b (5.00, 2.00). Polygon 300 vertices 302c (2.00, 0.75), 304c (4.00, 3.75), and 306c (5.00, 2.25). Likewise, polygon 300d has vertices 302d (2.00, 1.00), 304d (4.00, 4.00), and 306d (5.00, 2.50).

In addition, vertices 302 have a constant generic pixel display parameter $d_1$, while vertices 304 and 306 have constant generic pixel display parameters of $d_2$ and $d_3$, respectively. As used herein, the generic pixel display parameters may include any one or more pixel display parameters that define the display properties of corresponding lighted pixels on a display screen. Examples of display parameters that may be used according to the invention include r, g, b, a, u, v, w. The pixel display parameters do not need to be constant, but instead may vary over time as the polygon undergoes simulated motion. As used herein "display properties" refer to the visually-perceived or physical characteristics of the lighted pixels. According to the invention, the display properties of the lighted pixels are functions of the pixel display parameters assigned to the corresponding points in the subpixel coordinate system. In other words, a pixel display parameter will cause a lighted pixel to exhibit a specific display property.

The method further includes identifying the appropriate pixels to be lighted and the appropriate display properties of the lighted pixels at successive points in time. According to one embodiment of the invention, the pixels selected to be lighted are those whose integer pixel coordinates correspond to positions in the subpixel coordinate system that lie within or, optionally, on the boundary of the polygon. According to the same embodiment, the display properties of the selected pixels are identified by an interpolation process based on the defined pixel display parameters of the vertices of the polygon.

FIGS. 6a–6d depict one example of the lighted pixels that can be selected to successively render polygons 300a–300d on a display device. The display screen on which the images of the polygons are rendered according to the invention may be any display device on which computer-generated or computer-processed images may be displayed. For example, the display screens may be monitor 47 of FIG. 4, any other computer display device, a television set, or the like.

Figure 6A:
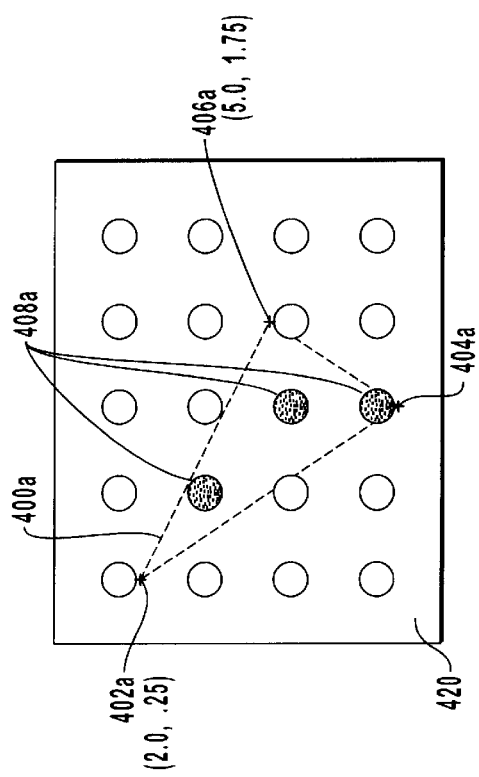
Figure 7:
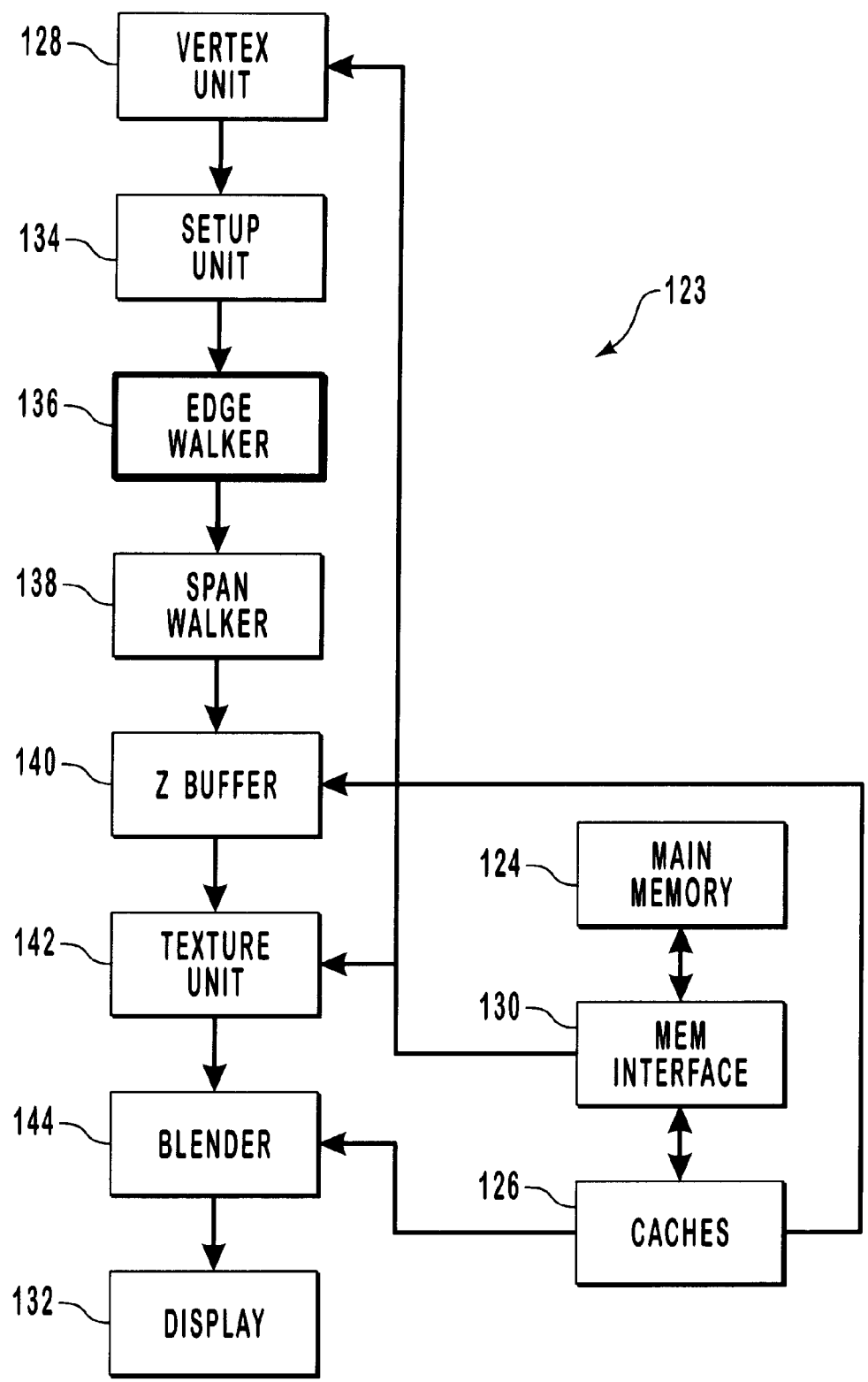
FIG. 7 is a schematic diagram illustrating program modules and other elements of a system for displaying polygons on a display screen according to the invention.

In FIG. 6a, a set of pixels 408a are lighted to represent polygon 300a on display screen 420. Pixels 408a have pixel coordinates of (3, 1), (4, 2), and (4, 3), each of which is positioned within polygon 300a. Any suitable method for identifying the pixels of display screen 420 whose coordinates are positioned within the corresponding polygon can be used. A specific method that is advantageously used is described in detail below in reference to FIGS. 8–13. FIG. 6a also shows polygon 400a and vertices 402a, 404a and 406a overlaid on display screen 420 to illustrate the selection and positioning of pixels 408a with respect to the position of polygon 300a of FIG. 5. It is noted that the dashed lines of polygon 300a and vertices 302a, 302b, and 302c are not actually displayed on display screen 402. Each of pixels 408a has display properties identified by an interpolation process based on the pixel display parameters $d_1$, $d_2$ and $d_3$, of the vertices of polygon 300a according to this embodiment of the invention. Any desired interpolation process may be used, such as linear interpolation that identifies the appropriate pixel display properties based on the relative position of pixel 408a and the vertices 302a, 304a, and 306a of polygon 300a. In general, the display properties of pixels 408a have some intermediate value with respect to those of the vertices, thereby generating the appearance of a color gradient, texture gradient, or the like over the area of the polygon on display screen 420.

FIG. 6b illustrates the rendition of polygon 300b on display screen 420 after a time interval has elapsed since the display of polygon 300a. The methods for identifying the pixels to be lighted on display screen 420 and for determining the display parameters of the lighted pixels are the same as those described above in reference to FIG. 6a. The set of pixels 408b that are lighted have coordinate values of (3, 1), (4, 2), and (5, 2). It is noted that the members of the set of pixels 408b are not identical to the members of the previous set of pixels 408a. In particular, the pixel located at (5, 2) is now lighted, while the previously lighted pixel (4, 3), is now turned off. The result is a general shift in the y-direction that generates the appearance of motion of the polygon in the y-direction.

The display configuration of FIG. 6b is further generated by again interpolating the appropriate display properties of the lighted pixels based on the relative position of the pixels and the vertices of polygon 300b. It is noted that, because the position of vertices of polygon 300b have shifted during the preceding time interval, the interpolated values of the lighted pixels generally will change from their previous values. In particular, pixels (3, 1) and (4, 2), which are lighted in both FIGS. 6a and 6b, will generally have different display properties in the two figures due to the interpolation process performed in each case.

Figure 6C:
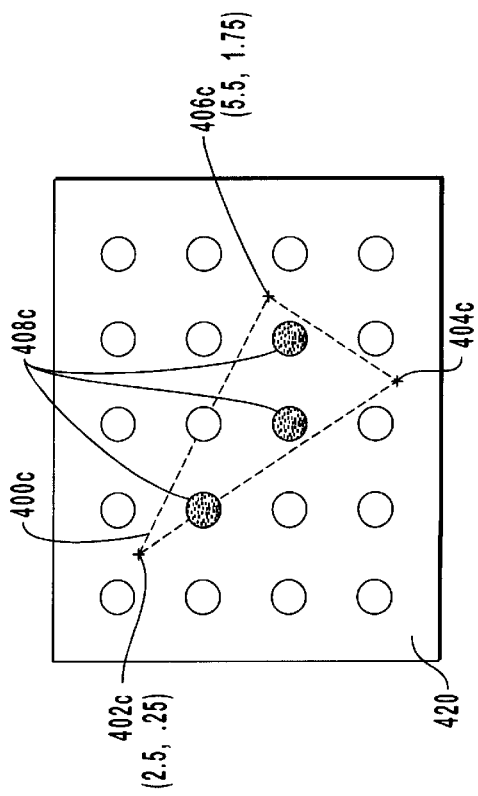

Turning now to FIG. 6c, the next position of the displayed polygon is illustrated. In this case, the set of lighted pixels 408c has the same members as the previous set of pixels 408b. However, even though the position of the lighted pixels has not changed from FIG. 6b to FIG. 6c, the adjustment of the display properties of the lighted pixels based on another interpolation process gives the appearance of continued motion of the polygon.

Finally, in FIG. 6d, the set of pixels 408d are identified and given the appropriate display properties according to the method described above in reference to FIGS. 6a–6c. Compared to the prior art methods of FIGS. 2a, 2b, and 3a–3e, the method of this embodiment generates the appearance of smoother motion. The prior art methods do not make intermediate adjustments in the identity and the display properties of the lighted pixels between the instants of time when the vertices of the polygons "snap" to the nearest adjacent integer pixel position. In contrast, the methods of the invention repeatedly identify the pixel positions that lie within, or, optionally, on the boundary of the polygon. Furthermore, the methods of the invention repeatedly interpolate the appropriate display properties of the lighted pixels. These two techniques repeatedly adjust the image of the polygon and provide the appearance of smooth motion.

EXAMPLE

FIGS. 7–13 illustrate a specific example of the program modules and hardware components of one embodiment of the invention and further illustrate a specific example of computational methods that can be advantageously used in conjunction with the invention to identify the position and display properties of the pixels to be lighted. The flow diagram of FIGS. 13a and 13b will be discussed in conjunction with the diagrams of FIGS. 7–12 to describe the steps performed according to this example of the methods of the invention. Triangle engine 123 of FIG. 7 renders three-dimensional objects in accordance with the present invention, and may be embodied in software as a set of modules and memories, or in hardware as a set of processors and memory devices. For example, triangle engine may be embodied in the computing environment illustrated in FIG. 4. Memory 124 contains a command list for the reconstruction of the triangles that are used to model the objects to be rendered. The list includes information on the transformed vertices that are selected to be lighted and instructions for their connection. In response to a command from a user or a software application, vertex unit 128 and a memory interface 130, reads the command list from memory 124. After receiving and preliminarily processing the command list, vertex unit 128 passes the appropriate vertex data to setup unit 134.

The vertex data passed from unit 128 to unit 134 are expressed in terms of a coordinate system defined by the pixel array of the eventual display. Due to the discrete positioning and relatively low resolution of the pixels, the vertices of a triangle rarely correspond directly with a pixel position. Accordingly, as described above in reference to FIGS. 5 and 6a–6d, the positions of the pixels to be lighted on the display screen usually do not precisely correspond to the positions of the triangle vertices.

Edge walker 136 is employed to minimize the effects of discrete jumps between pixel positions when a moving object consisting of a number of triangles or other polygons is rendered on a display screen. Edge walker 136 adjusts the pixel values in such a way that the discrete movement of the rendered polygon between integer pixel locations is masked. As used herein "adjusting" pixel values refers to a process of selecting appropriate pixels to be displayed on the display screen in order to render an image of a polygon. In other words, the coordinates defining the polygon are adjusted to integer pixel positions at the display screen. The appropriate pixels are selected to correspond to the position of the triangle in the coordinate system in which its movement is tracked.

During the process of forming the command list, the computer-executable instructions used to form the command list impose a subpixel coordinate system on the vertices that define the triangles according to one embodiment of the invention. The imposition of the subpixel coordinate system may be performed by multiplying the x and y coordinates of the vertices by a scale factor greater than one. In the embodiment illustrated in FIGS. 8–12, the scale factor is four. Multiplication by four is conveniently accomplished by left shifting twice the digital expression of the coordinates of the vertices. Those skilled in the art will appreciate that the subpixel coordinate system may instead have any other resolution that is greater than the resolution of the pixel coordinate system.

The resultant command list is stored in main memory 124 and is accessed by vertex unit 128 as described above. Setup unit 134 takes the vertex information for a triangle from vertex unit 128 and computes a few parameters needed by edge walker 136 as described in greater detail below. It is noted that edge walker 136 is responsible for recognizing that the subpixel coordinate system has been imposed on the coordinates of the vertices. Edge walker 136 is also responsible for performing the iterative process of identifying points in the subpixel coordinate system that lie within or at the boundary of the triangle and correspond to integer pixel positions. The iterative process is more fully described below.

In this embodiment, the fact that the vertices are assigned subpixel coordinate values does not affect any other units in the pipeline (triangle engine 123), including vertex unit 128 and setup unit 134. The other units execute the same data path regardless of whether the vertex coordinates have been expressed in pixel or subpixel values. Edge walker 136 is the only unit in triangle engine 123 that is affected by the imposition of the subpixel coordinate system on the triangle. For this reason, edge walker 136 has been highlighted in FIG. 7.

Figure 8:
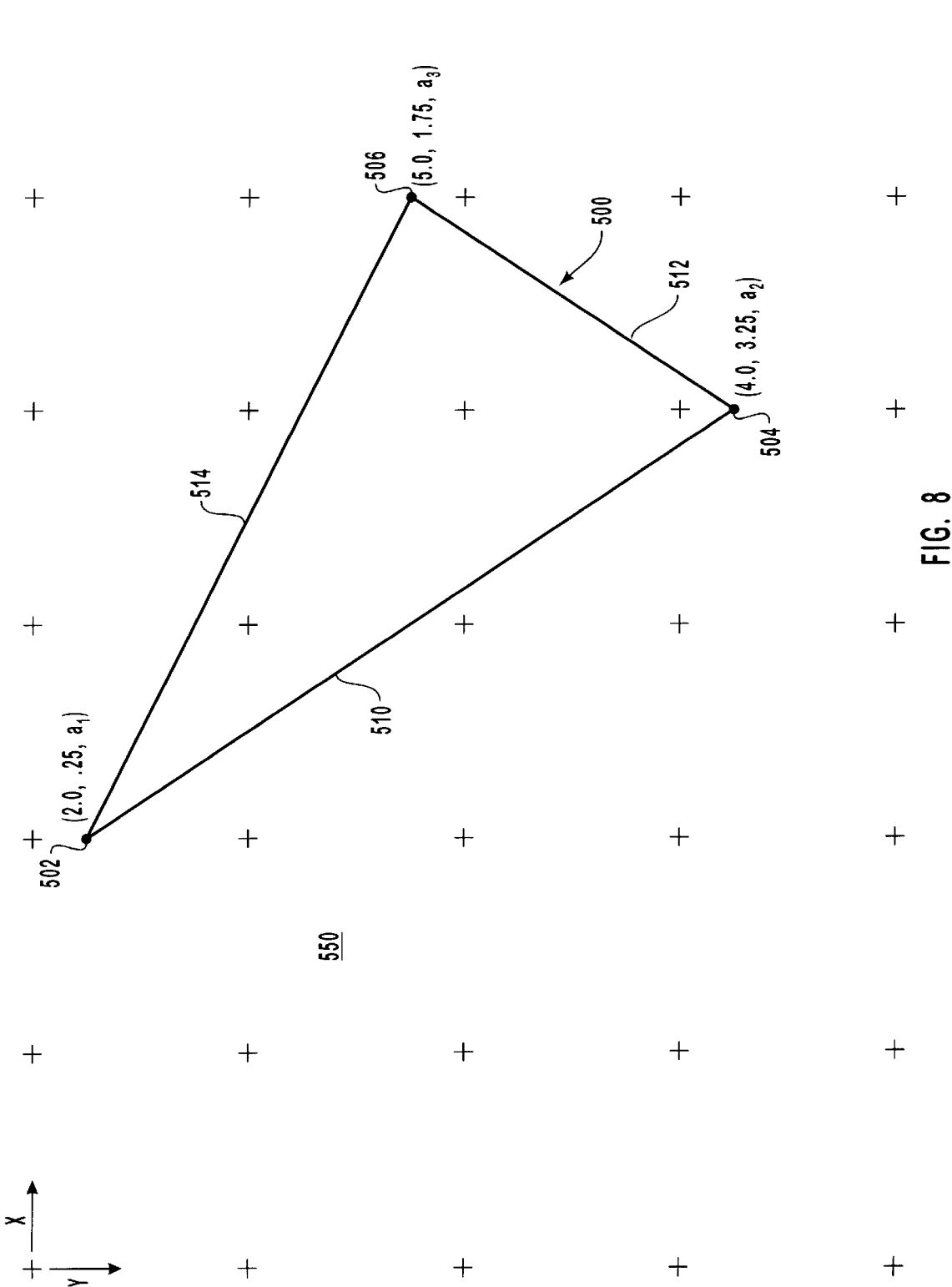
FIG. 8 depicts a polygon positioned in a pixel coordinate system existing in a computer-readable medium.

FIG. 8 illustrates triangle 500, which is identical to polygon 300a of FIG. 5. Triangle 500 represents the transformed and lighted vertices and connections of a triangle produced by vertex unit 128. Layered over triangle 500 is a grid 550 whose integer coordinate positions correspond with some of the pixel positions of display 132. It is noted that the vertices of triangle 500 do not correspond with any of the pixel positions of display 132. Specifically, the three vertices of triangle 500 are expressed as fractional values when translated to the pixel coordinate system. Vertex 502 is located at (2.00, 0.25) in pixel coordinates, while vertices 504 and 506 are at (4.00, 3.25) and (5.00, 1.75) respectively. In this example, a texture display parameter, which specifies a texture display characteristic of the pixels on display 132 when the vertices are graphically displayed, is associated with each of the vertices. In this example, vertices 502, 504, and 506 have display parameters of $a_1$, $a_2$, and $a_3$, respectively. In addition, each vertex may be associated with red, r, green, g, blue, b, and/or other display parameters.

According to this example, four subpixel units are imposed on each pixel unit. Specifically, vertex 504 having coordinates (4.00, 3.25) is translated to vertex 504' with subpixel coordinates (16, 13). Likewise, vertex 502 at (2.00, 0.25) becomes vertex 502' at subpixel coordinates (8, 1), and vertex 506 at (5.00, 0.75) becomes vertex 506' having subpixel coordinates (20, 7). As a result, triangle 500 in the pixel coordinate system is translated to triangle 500' that exists in the subpixel coordinate system illustrated at grid 550' in FIG. 9. The foregoing subpixel coordinates associated with vertices 502', 504', and 506' are those that are written to the command list in main memory 124. The display parameters, such as material, texture, and lighting values, associated with triangle 500 are not altered in the command list. As previously noted, the subpixel coordinates of the vertices, along with the display parameters, are passed to setup unit 134 via memory interface 130 and vertex unit 128.

Figure 9:
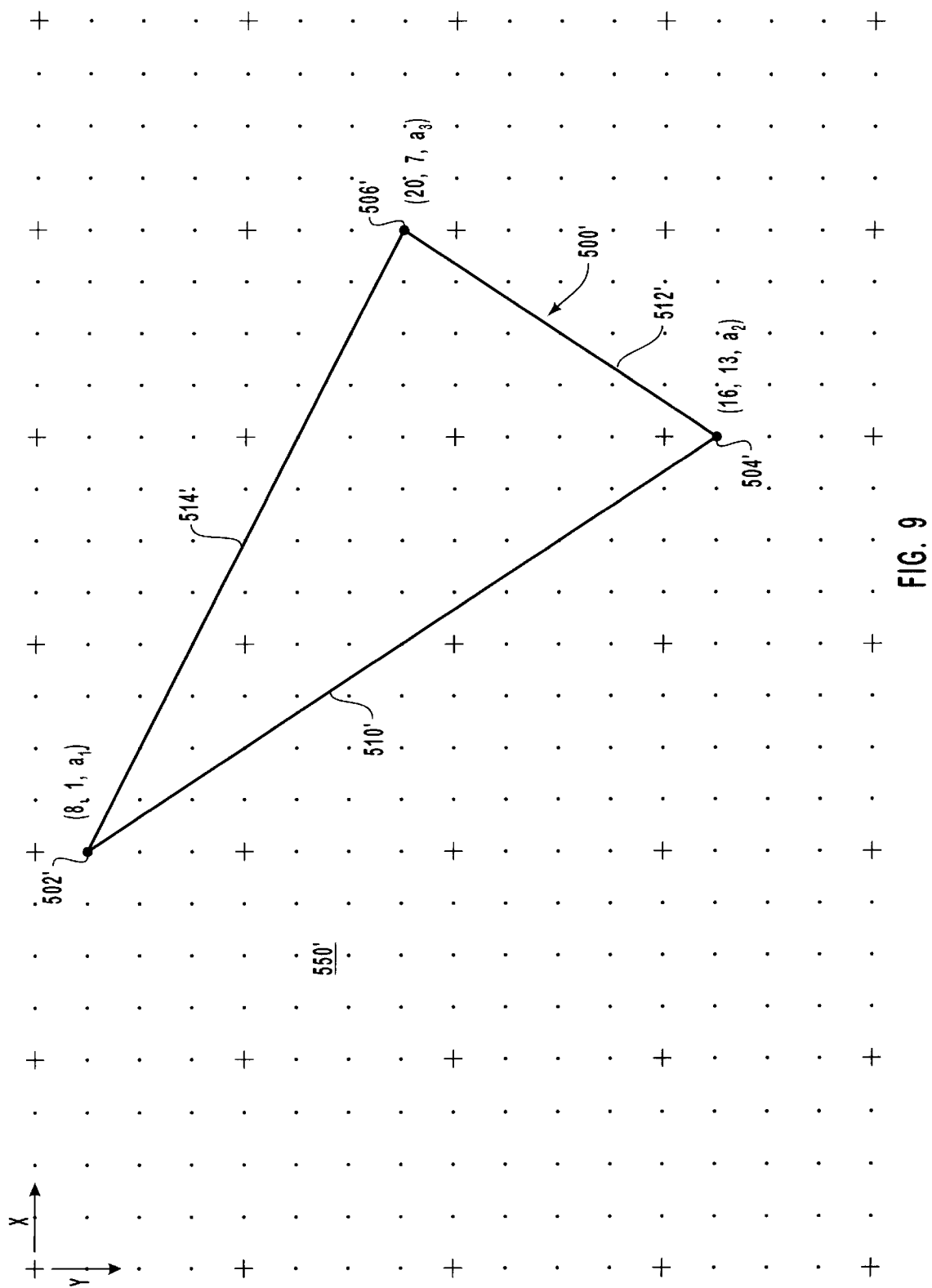
FIG. 9 illustrates the polygon of FIG. 8, wherein the pixel coordinate system has been transformed into a subpixel coordinate system.

Upon receiving the subpixel coordinate values, setup unit 134 sorts the vertices to determine the top, middle, and bottom vertices. In this embodiment, the sorting is done in the ascending order of the y subpixel coordinate values of the three vertices. The sorting determines the long edge of the triangle, which is the edge which spans the greatest vertical distance as ultimately viewed on display 132. Setup unit 134 determines the long edge by simply noting the pair of vertices with the greatest difference in y subpixel coordinates. The edge that connects the top to the bottom vertex is the long edge of the triangle. In the example of FIG. 9, edge 510' extends from to vertex 502' with a subpixel coordinate set of (8, 1) and vertex 504' with a subpixel coordinate set of (16, 13). Edge 510' is the long edge since it spans 12 (=13−1) sub-units along the y-axis. In comparison, edge 512' spans only 6 (=13−7) and edge 514' spans only 6 (=7−1). Although in this example the vertices happen to be already sorted as top, middle and bottom, in a typical case, the sorting process often involves some reordering of the vertices.

The following discussion is directed to several additional parameters associated with triangle 500' that setup unit 134 computes in preparation for the iterative process that will be conducted by edge walker 136. Before describing the particular parameters calculated according to this embodiment, the purpose of these parameters is first explained. In order to identify the pixels to be lighted on display screen 132, edge walker 136 and span walker 138 will identify the points in the subpixel coordinate system that lie within or, optionally, at the boundary of triangle 500' and correspond to integer pixel positions on the display screen. According to this embodiment, edge walker 136 will iteratively select test points on or near long edge 510', beginning with one end of the long edge. The parameters defined below are used by edge walker 136 to determine whether the selected test points lie within or, optionally, at the boundary of triangle 500'.

Figure 10:
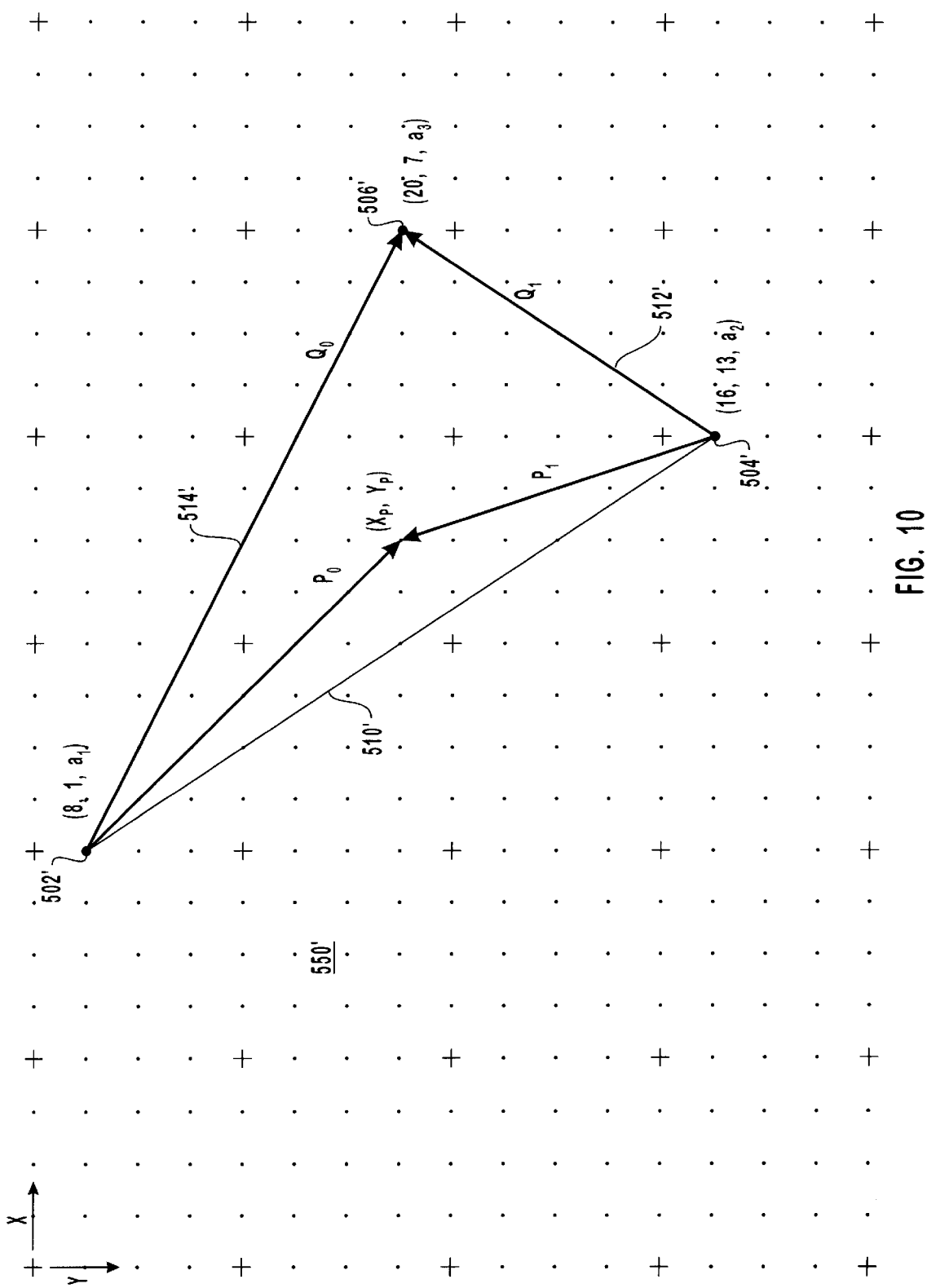
FIG. 10 illustrates a set of vectors defining characteristic functions associated with the polygon of FIG. 9.

Setup unit 134 determines a pair of characteristic functions for triangle 500' as shown in FIG. 10. The characteristic functions are determined from each end of long edge 510'. The first characteristic function, $CF_A$, is the cross-product of two vectors seated at vertex 504', while the second characteristic function, $CF_O$, is the cross-product of two vectors seated at vertex 502'. Specifically, $CF_A$ is the cross-product of fixed vector $Q_1$ (which originates at vertex 504', terminates at vertex 506', and has a magnitude equal to the length of side 512') and variable vector $P_1$ (which originates from vertex 504' and varies in termination points and magnitudes). $CF_O$ is the cross-product of fixed vector $Q_0$ (which originates at vertex 502', terminates at vertex 506', and has a magnitude equal to the length of side 514') and variable vector $P_0$ (which originates from vertex 502' and terminates at the same point as $P_1$).

By using linear algebra, cross-products $CF_A$ and $CF_O$ are determined from the subpixel coordinates of the triangle in question. For example, $CF_A$, the cross-product of $P_1$ and $Q_1$, is calculated by applying the algebraic expansion of the determinate expression of the cross-product. Specifically:

$$CF_A = P_1 \times Q_1; \quad (1)$$
$$= ((x_P - x_{504'})i + (y_P - y_{504'})j + 0k) \times ((x_{506'} - x_{504'})i + (y_{506'} - y_{504'})j + 0k);$$

where $i$, $j$, and $k$ are the unit vectors along the $x$, $y$ and $z$ axes, respectively -continued $$= x_P(y_{506'} - y_{504'}) - x_{504'}(y_{506'} - y_{504'}) - y_P(x_{506'} - x_{504'}) + y_{504'}(x_{506'} - x_{504'});$$

$$= A_{504'}x_P - B_{504'}y_P - C_{504'};$$

where, $A_{504'} = y_{506'} - y_{504'};$ $B_{504'} = x_{506'} - x_{504'};$ $C_{504'} = x_{504'}(y_{506'} - y_{504'}) - y_{504'}(x_{506'} - x_{504'});$ and $x_P$ and $y_P$ are the termination subpixel coordinates of $P_1$ (and $P_0$).

Likewise, $$CF_O = P_0 \times Q_0; \quad (2)$$
$$= A_{502'}x_P - B_{502'}y_P - C_{502'};$$

where, $A_{502'} = y_{506'} - y_{502'};$ $B_{502'} = x_{506'} - x_{502'};$ $C_{502'} = x_{502'}(y_{506'} - y_{502'}) - y_{502'}(x_{506'} - x_{502'});$ and $x_P$ and $y_P$ are the termination subpixel coordinates of $P_0$ (and $P_1$).

Figure 11:
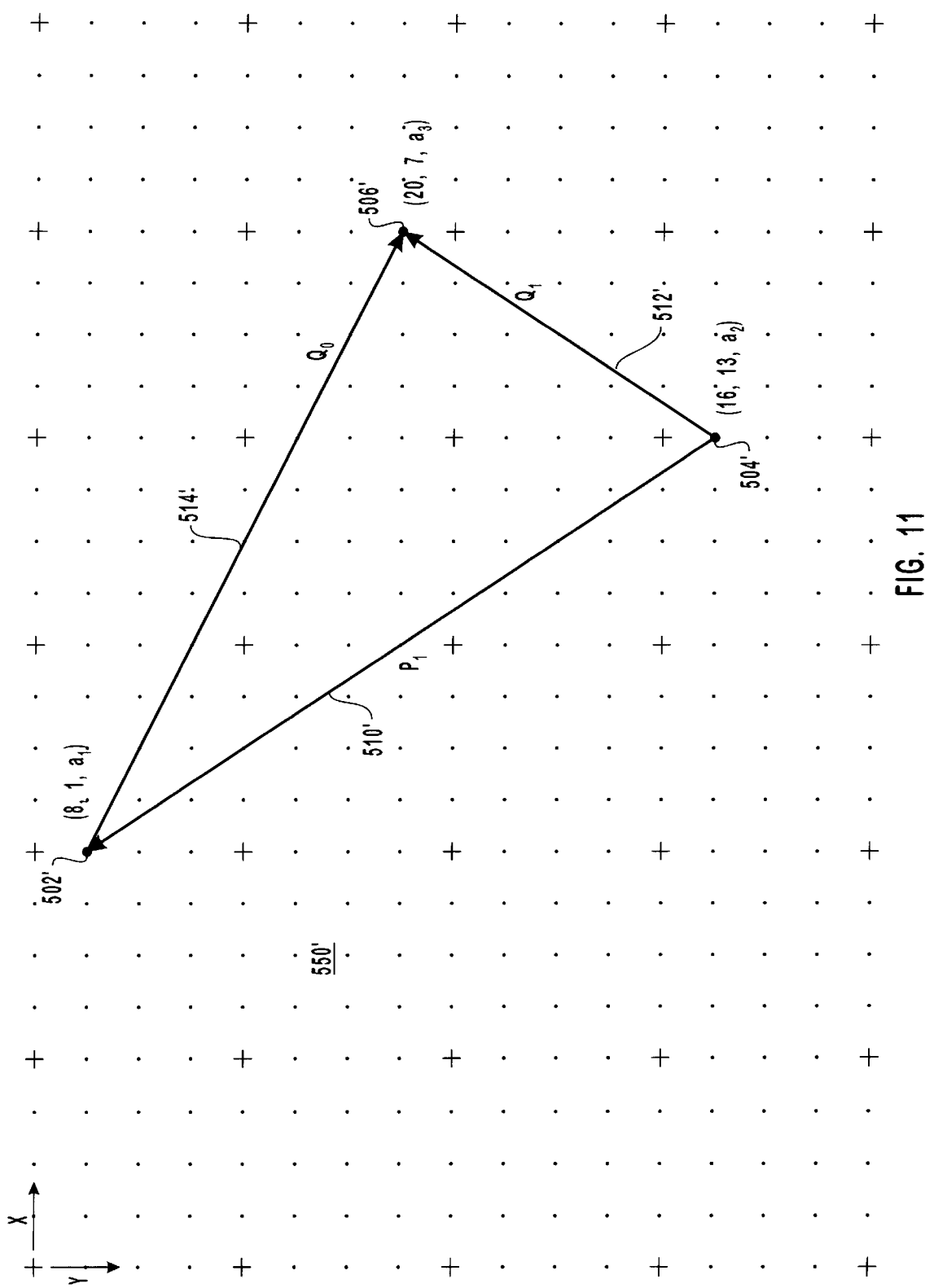
FIG. 11 shows the initial state of the vectors defining the characteristic functions associated with the polygon according to the present invention.

Applying (1) and (2) to triangle 500', setup unit 134 determines the initial values of $CF_{AI}$ and $CF_{OI}$. As shown in FIG. 11, $P_0$ is initially a null vector, while $P_1$ points from vertex 504' to vertex 502' and has a magnitude equal to the length of side 510'. Thus, the termination subpixel coordinates of $P_1$ and $P_0$ are the subpixel coordinates of vertex 502', namely (8, 1). Therefore, $$CF_{AI} = (7-13)(8) - (20-16)(1) - [(16)(7-13) - (13)(20-16)]$$

$$= -48 - 4 + 96 + 52$$

$$= 96; \text{ and}$$

$$CF_{OI} = (7-1)(8) - (20-8)(1) - [(8)(7-1) - (1)(20-8)]$$

$$= 0.$$

Since the initial values of $P_1$ and $Q_1$ coincide with two of the three sides of the triangle, the initial value of $CF_A$ is a vector with a magnitude equal to twice the area of triangle 500'. In contrast, since the initial value of $P_0$ is a null vector, the initial value of $CF_O$ is a vector of magnitude zero. The sum of the initial magnitudes of $CF_A$ and $CF_O$ is equal to twice the area of triangle 500'. Edge walker unit 136 will later determine the values of $CF_A$ and $CF_O$ at a series of test points $(x_P, y_P)$ are iteratively selected at or near long edge 510'. When sum of the magnitudes of the characteristic functions at a test point is less than twice the area of the triangle, it will be assumed that the test point lies within the triangle.

During the iterative process of selecting test points along long edge 510', edge walker 136 starts with an initial value $P_0 \times Q_0$ and iterates this value along the long edge for each increment of y. In each iteration, y is incremented by 1 and x is incremented by Dx, which is the geometric slope along the long edge. The geometric slope is the difference in the x coordinates divided by the difference in the y coordinates along the long edge, which is typically a fractional value. Since triangle engine 123 is not configured to select test points having fractional subpixel coordinates in this embodiment, Dx is rounded to its nearest integer. The direction of the rounding, up or down, depends on the scan direction of the triangle. The scan direction is the direction in which edge walker 136 successively selects test point along lines parallel to the x axis during the iterative process to be more fully described below. The triangles are scanned from left-to-right if the long edge of the triangle is on the left (as in the present example). Dx is to be rounded down to the next integer for left-to-right scanning. Triangles are scanned from right-to-left if the long edge is on the right of the triangle. Dx is to be rounded up to the next integer for right-to-left scanning.

In order to appropriatedly round Dx to an interger value, the functions FLOOR and CEIL are defined. CEIL(x) rounds a number, x, up to the next highest integer. For example:

CEIL(1.5)=2; and

CEIL(-1.5)=-.

In contrast, FLOOR(x) rounds a number, x, down the next lowest integer. For example:

FLOOR(1.5)=1; and

FLOOR(-1.5)=-2.

Accordingly, since the scan direction in the present example is left-to-right, $$Dx = FLOOR((x_{504'} - x_{502'})/(y_{504'} - y_{502'})).$$

If the scan direction had instead been right-to-left, Dx would have been defined as $CEIL((x_{504'} - x_{502'})/(y_{504'} - y_{502'}))$.

Using the slope and the characteristic functions, setup unit 134 calculates the changes in the values of $CF_A$ and $CF_O$ as the ends of $P_0$ and $P_1$ are incremented along the long edge of the triangle. Specifically, setup unit 134 determines these changes for increments of one unit lengths in the y-direction ($Dy_P=1$) and the corresponding increment in the x-direction ($Dx_P$) as dictated by the slope of long edge 510'. As a result, the next values, $CF_{ON}$ and $CF_{AN}$, of the characteristic functions are determined as follows:

$$CF_{OI} = A_{502'}x_P - B_{502'}y_P - C_{502'}$$

$$CF_{ON} = A_{502'}(x_P + Dx_P) - B_{502'}(y_P + Dy_P) - C_{502'}, \text{ where } Dy_P = 1$$

$$= A_{502'}x_P + A_{502'}Dx_P - B_{502'}y_P - B_{502'} - C_{502'}$$

$$= CF_{OI} + A_{502'}Dx_P - B_{502'}.$$

Therefore as $P_0$ changes along long edge 510' in one unit increments in the y-direction, the change in $CF_O$ is $A_{502'}Dx_P - B_{502'}$. The value $A_{502'}Dx_P - B_{502'}$ is defined to be $dxy_O$. Likewise, $CF_{AN} = CF_{AI} + A_{504'}Dx_P - B_{504'}$, and the value $A_{504'}Dx_P - B_{504'}$ is defined to be $dxy_A$.

In order to calculate values for $dxy_O$ and $dxy_A$, it is first necessary for setup unit 134 to determine $Dx_P$. So for triangle 500', since the scan direction is left-to-right, $Dx_P$ is given by $$Dx_P = FLOOR((x_{504'} - x_{502'})/(y_{504'} - y_{502'}))$$

$$= FLOOR((16-8)/(13-1))$$

-continued $$= FLOOR(2/3) = 0;$$

Using $Dx_P=0$, unit 134 calculates the values of $dxy_O$ and $dxy_A$ as follows:

$$\begin{aligned} dxy_A &= A_{504'} Dx_P - B_{504'} \\ &= (y_{506'} - y_{504'})(Dx_P) - (x_{506'} - x_{504'}) \\ &= (7-13)(0) - (20-16) \\ &= -4; \end{aligned}$$

$$\begin{aligned} dxy_O &= A_{502'} Dx_P - B_{502'} \\ &= (y_{502'} - y_{506'}) Dx_P - (x_{502'} - x_{506'}) \\ &= (1-7)(0) - (8-20) \\ &= 12. \end{aligned}$$

The setup unit also calculates the changes in the values of $CF_A$ and $CF_O$ as $P_0$ and $P_1$ are incremented by ($Dx_P=1$, $Dy_P=0$). These changes in values of $CF_A$ and $CF_O$ will be used by span walker 138 as it later iterates along a span (e.g., successively selects test points along a line parallel to the x axis) to determine the pixels in a span. Note that for a left-to-right triangle $Dx_P=1$ and for a right-to-left triangle $Dx_P=-1$.

$$CF_{OI} = A_{502'} x_P - B_{502'} y_P - C_{502'}$$

$$\begin{aligned} CF_{ON} &= A_{502'}(x_P + Dx_P) - B_{502'}(y_P + Dy_P) - \\ &\quad C_{502'}, \text{ where } Dx_P = 1 \text{ and } Dy_P = 0 \\ &= A_{502'} x_P + A_{502'} - B_{502'} y_P - C_{502'} \\ &= CF_{OI} + A_{502'}. \end{aligned}$$

Therefore as $P_0$ is incremented one unit in the x-direction, the change in $CF_O$ is $A_{502'}$. The value $A_{502'}$ is defined to be $dx_O$. Likewise, $CF_{AN}=CF_{AI}+A_{504'}$, and $A_{504'}$ is defined to be $dx_A$. The values of $dxy_O$ and $dxy_A$ are calculated as follows:

$$\begin{aligned} dx_A &= A_{504'} \\ &= (y_{506'} - y_{504'}) \\ &= (7-13) \\ &= -6; \end{aligned}$$

$$\begin{aligned} dx_O &= A_{502'} \\ &= Y_{502'} - Y_{506'} \\ &= (1-7) \\ &= -6. \end{aligned}$$

The setup unit also calculates the gradients along the long edge and the gradient along the x axis for each of the material and texture values r, g, b, a, u, v, and w. The gradients of the foregoing parameters are later used to assign appropriate values of material property parameters r, g, b and a and texture and perspective parameters u, v and w to the integer pixel positions identified by edge walker 136 and span walker 138. In particular, the parameters are assigned to the identified pixel positions using bilinear interpolation according to one embodiment of the invention.

In summary, setup unit 134 calculates the following values:

$Dx_P=0$ (slope of long edge);
$CF_{AI}=96$ (initial value of $CF_A$);
$dxy_A=-4$ (change in value of $CF_A$ for each increment of $Dx_P=0$ and $Dy_P=1$);
$dx_A=-6$ (change in value of $CF_A$ for each increment of $Dx_P=1$ and $Dy_P=0$);
$CF_{OI}=0$ (initial value of $CF_O$);
$dxy_O=12$ (change in value of $CF_O$ for each increment of $Dx_P=0$ and $Dy_P=1$); and
$dx_O=6$ (change in value of $CF_O$ for each increment of $Dx_P=1$ and $Dy_P=0$).

Of these values, $CF_{AI}$, $dxy_A$, $dx_A$, $CF_{OI}$, $dxy_O$, and $dx_O$ are passed from the setup unit 134 to edge walker unit 136. Unit 136 receives these values and uses them to select test points $(x_P, y_P)$ at or near long edge 510' of triangle 500' in a process illustrated in FIG. 12. In doing so, edge walker unit 136 locates any nearest interior pixel to vertex 504'. An "interior" pixel or point is defined herein to be one that is located within the polygon or, optionally, on one of its edges. It is noted that the invention can be practiced using any desired boundary condition, i-e., points or pixels lying on polygon edges can be considered to be within the polygon or, alternatively, not within the polygon. In this example, pixels lying on edge 510' are considered to be interior pixels.

Unit 136 first determines whether vertex 504' itself corresponds with a whole pixel coordinate. Note that since the original vertices were multiplied by a scale factor of 4 by the computer-executable instructions that prepared the command list, any vertex or interior point having subpixel coordinates evenly divisible by 4 corresponds to a pixel position in this example. Thus, edge walker 136 divides vertex subpixel coordinates by the scale factor (in this case, 4), and notes whether the results are integers. In most cases, as with triangle 500', this process is trivial, since the process of dividing by the scale factor merely undoes the process of multiplying by the scale factor, resulting in the original fractional pixel coordinates. However in some cases, the vertex may actually coincide with a pixel position, and the nearest surface pixel has been identified. In these trivial cases, no interpolation or other adjustment of the vertex pixel parameters is required, since the position of the vertex coincides with that of the pixel.

Once it has been determined that the starting vertex does not coincide with a pixel position, edge walker unit 136 locates the nearest interior pixel location. This is performed by an iterative process in which the edge walker repeatedly locates and processes test points $(x_P, y_P)$ in the subpixel coordinate system until it has determined an interior point whose subpixel coordinates produce whole numbers when divided by the scale factor. In order to generate a first test point, unit 136 starts with the subpixel coordinates of vertex 502', (8, 1), of FIG. 12. From these subpixel coordinates, unit 136 proceeds in the general direction of vertex 504' by adding $Dx_P=0$ to the x-subpixel coordinate, 8, and $Dy_P=1$ to the y-subpixel coordinate, 1. Accordingly, the first test point in this example is (8, 2).

In order to determine whether the test point is interior or on the surface of triangle 500', edge walker unit 136 adds $dxy_A$ and $dxy_O$ to the current values of $CF_A$ and $CF_O$ respectively. Since the current values, $CF_{AI}$ and $CF_{OI}$, were produced from vectors that resided on long edge 510', the sum of their magnitudes is equal to twice the area of triangle 500'. Once $dxy_A$ and $dxy_O$ are added, however, the sum of the magnitudes is greater than twice the area of the triangle. A sum of characteristic function magnitudes that is greater than twice the area of the triangle indicates that the endpoint of vectors $P_0$ and $P_1$, which is also the test point, lies outside of the triangle. Specifically:

$CF_A = CF_{AI} + dxy_A = 96 - 4 = 92;$ $CF_O = CF_{OI} + dxy_O = 0 + 12 = 12;$ and $CF_A + CF_O = 92 + 12 = 104 > 96.$ Thus, the test point (8, 2) lies outside the triangle, and the iterative process continues. It is noted that the material parameter values and the texture parameter values are also adjusted by their corresponding gradients as the test points are iteratively selected.

In order to locate a test subpixel position within the triangle, unit 136 increments the x-subpixel coordinate by one unit, thereby bringing the next test point into or closer to the triangle without changing the y-coordinate value. This corresponds to changing the test point by $Dx_P=1$ and $Dy_P=0$, yielding a test point (9, 2). As determined by the setup unit, the corresponding changes to $CF_O$ and $CF_A$ are $dx_O=6$ and $dx_A=-6$, respectively. Thus:

$CF_A = 92 + dx_A = 92 - 6 = 86;$ $CF_O = 12 + dx_O = 12 + -6 = 6;$ and $CF_A + CF_O = 86 + 6 = 92 < 96.$ Since the sum of the magnitudes of the characteristic functions is less than twice the area of triangle 500', the new test point falls within the triangle. It is also noted that the corresponding material and texture parameter values are again adjusted by their corresponding gradient value in the x-direction. Edge walker unit 136 then analyzes the test point to determine whether it corresponds to an integer pixel position. First, unit 136 determines whether the y-subpixel coordinate, 9, of the test point is divisible by the scale factor, which is four in this example. Since the y-subpixel coordinate is not divisible by four, it is determined that the test point does not correspond to an integer pixel position, and furthermore, that the test point does not have the same y-coordinate value as an integer pixel position.

Figure 12:
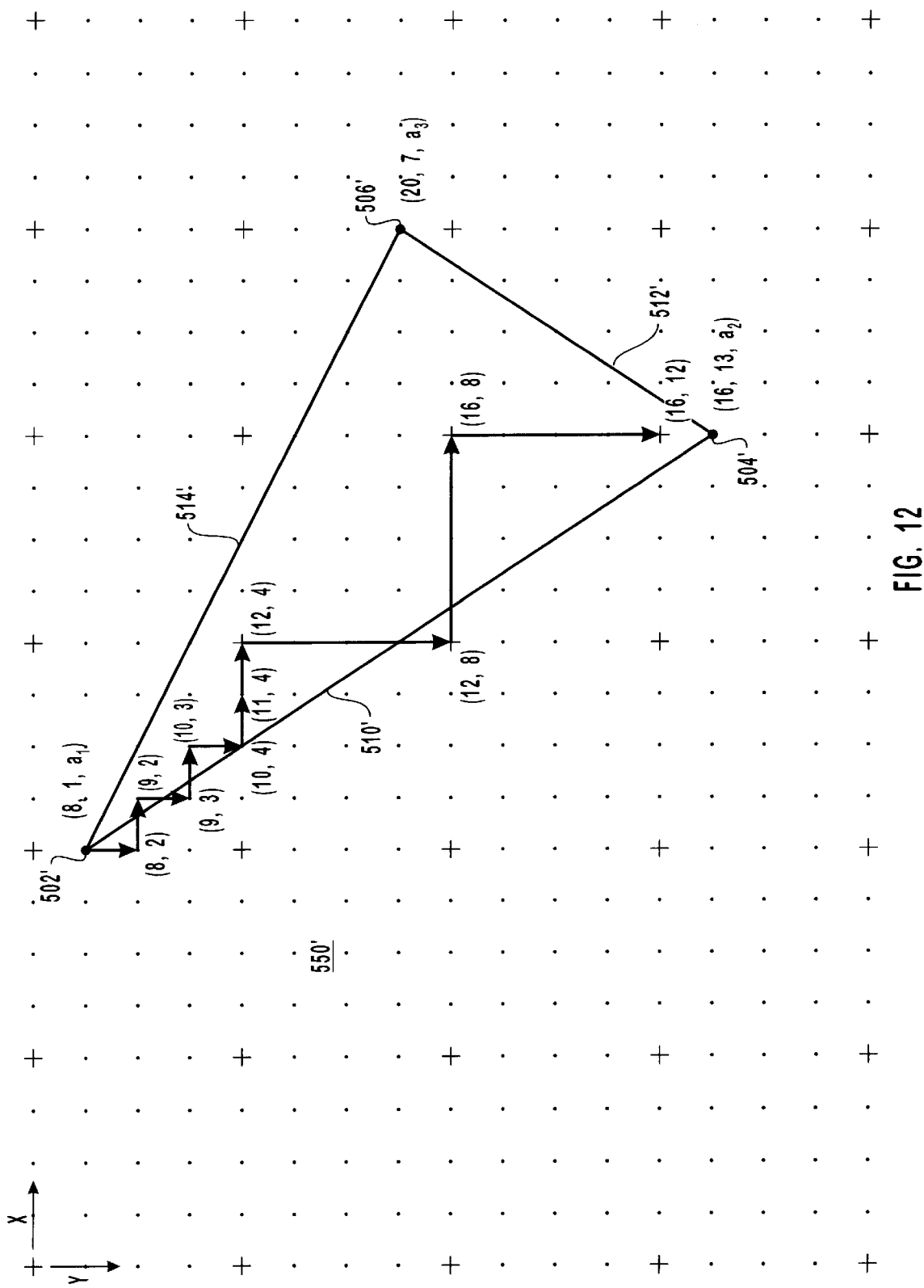
FIG. 12 shows a set of vectors representative of an iterative process for locating pixel locations within the polygon according to the present invention.

As illustrated in FIG. 12, edge walker 136 continues to iteratively select test points until the y-subpixel coordinate is divisible by four. Once an evenly divisible y-subpixel coordinate is identified, test points are successively selected along the span by incrementing only the x-subpixel coordinates, until the x-subpixel coordinate is also evenly divisible by four. A test point that has x and y subpixel coordinates evenly divisible by the scale factor (in this example, 4) corresponds to a pixel position.

Referring to FIG. 12, the iterations performed by edge walker 136 to identify the first subpixel coordinate set (12, 4) that corresponds to a pixel position is illustrated. In particular, test points (9, 3) and (10, 3) are selected before test point (10, 4) is identified and it is determined that its y-subpixel coordinate, 4, is evenly divisible by 4. Since test point (10, 4) is an interior point and has an evenly divisible y-subpixel coordinate, edge walker 136 iteratively selects test points (11, 4) and (12, 4), which is the first test point that corresponds to an integer pixel position.

By a similar process as described above and in conjunction with the location of the nearest, or starting, pixel, edge walker unit 136 interpolates the pixel parameters from the values of the pixel parameters assigned to vertices 502' and 504'. As previously noted, each r, g, b, a, u, v, and w parameter has a gradient component and a d/dx component. When the long edge is walked by unit 136, the components are adjusted by the gradients. If a step-back needs to be performed, the components are further adjusted by their d/dx values. As a result, rather than a simple repositioning of vertex 502', the appropriate parameter values are assigned to the lighted pixels by interpolation.

Those skilled in the art will recognize that other interpolation processes can be used with the invention. For example, in one embodiment, the pixel display parameters are not incremented by their gradient or d/dx values with each iteratively selected test point. Instead, once a test point is found to correspond to a pixel position, the pixel display parameters to be assigned to the test point are determined by a simple linear or bilinear interpolation process based on the relative position of the test points and the vertices.

As used herein, "interpolation" is defined to include any process whereby the value of a variable at a point in a coordinate system is selected or identified based on known or defined values of the variable at other points in the coordinate system. This includes conventional linear, bilinear, trilinear or higher-order interpolation with respect to a point that lies at some intermediate position relative to reference, or baseline, points in a coordinate system. This definition of "interpolation" expressly extends to the process described herein of incrementing the pixel display parameters of successively selected test points with the gradients and/or d/dx values of the display parameters. "Baseline point" refers to a point in the coordinate system where the value of the variable is known or defined. The vertices are typically baseline points.

Once the starting pixel has been determined and the pixel parameters are adjusted accordingly, the remaining pixels along the long edge are quickly determined. This is due to the fact that once one pixel has been located, the pixel, rather than the subpixel, coordinate system may be used. Specifically, once the pixel at (12, 4) in FIG. 12 has been located, edge walker unit 136 proceeds directly to the pixel at (12, 8). Unit 136 does so by using $CF_A$, $CF_O$, $dxy_A$, and $dxy_O$ as described in the process above, with the exception that $dxy_A$, and $dxy_O$ are first multiplied by the scale factor, four. Thus, rather than moving in subpixel increments, edge walker unit 136 moves in pixel increments.

Once edge walker unit 136 determines that pixel (12, 8) of FIG. 12 is located outside of the triangle by using the method described above, it proceeds directly to the pixel located at (16, 8) using $CF_A$, $CF_O$, $dx_A$, and $dx_O$ as described in the process above, again with the exception that $dx_A$, and $dx_O$ are first multiplied by four. After the pixel located at (16, 8) is determined to be inside the triangle, edge walker unit 136 proceeds to pixels (16, 12) and determines that it is also inside the triangle. It is noted that, in conjunction with the location of pixels (16, 8) and (16, 12), the corresponding r, g, b, a, u, v, and w display parameters are adjusted as described above. In addition, the identified pixel locations are sent to span walker 138 as pixel coordinates (3, 1), (4, 2), and (4, 3).

In summary, edge walker unit 136 determines that the long edge of triangle 500' is described by three pixels, those located at (12,4), (16,8) and (16,12). In addition, unit 136 identifies the appropriate r, g, b, a, u, v, and w display parameters for each of the three pixels by interpolation based on the display parameters at the vertices of the triangle. It then passes the pixels and their interpolated display parameters to span walker 138.

Given the location of the edge pixels (12, 4), (16, 8) and (16, 12), span walker 138 determines any remaining pixels that reside within triangle 500'. It does so by proceeding horizontally from the edge pixels. For example, from (12, 4), the span walker proceeds to (16, 4), which is one pixel to the right. Upon determining that this pixel is outside of the triangle, unit 138 proceeds to the next horizontal span of (16, 8) and (20, 8). The pixel located at (20, 8) is outside of the triangle, as is the next pixel of the remaining span, that formed by (16, 12) and (20, 12). Thus, span walker unit 138 determines that the only pixels residing within the triangle are those that were located by the edge walker. It is noted that if the span walker had located additional interior pixels, the corresponding pixel display parameters would be interpolated and adjusted as described above.

Once all interior pixels have been located, the remaining processing is performed in this embodiment by zbuffer unit 140, texture unit 142, and destination blender 144. Zbuffer unit 140 determines whether a given pixel will be displayed based on depth. If the pixel is behind another object it will not be processed through the rest of the pipeline. Texture unit 142 reads texture data from an external memory and maps it to the triangles based on u, v, and w, values using different filtering algorithms. Destination blender 144 blends the rendered triangles with the background and provides special fogging functions to produce special visual effects.

Figure 13A:
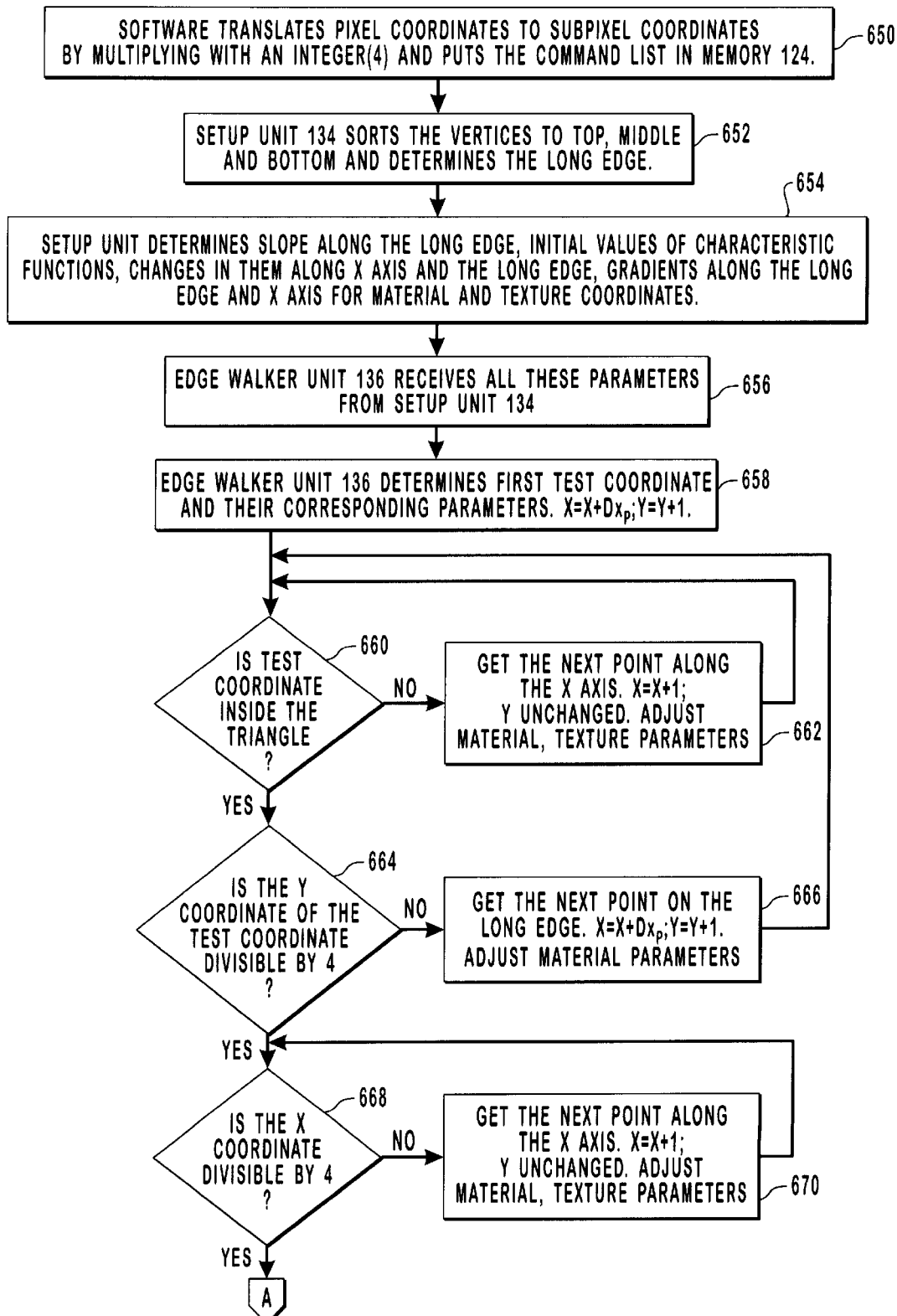
FIGS. 13a and 13b illustrate a flow diagram of the iterative process for locating the pixel locations within the polygon.
Figure 13B:
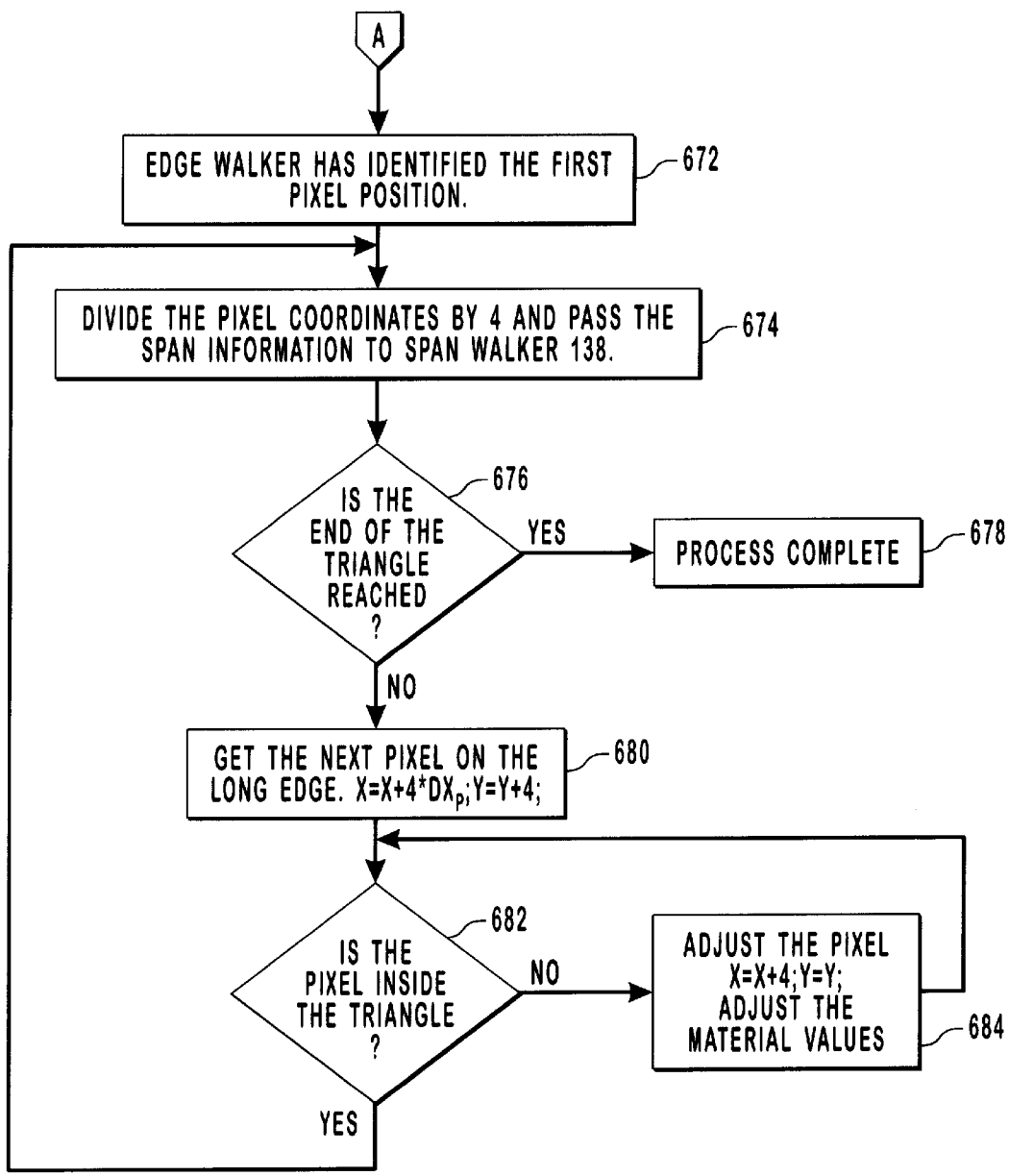

Shown in FIGS. 13a and 13b is a flow diagram illustrating a method in accordance with the present invention for locating the first pixel within the triangle and adjusting the corresponding pixel parameters. In step 650, the vertices of a polygon are translated by computer-executable instructions into subpixel coordinates by multiplying them with an integer. In a preferred embodiment, the polygon is a triangle, but it is recognized that other polygons may be used. In a preferred embodiment, the integer is four, but it is recognized that other integers may be used. The computer-executable instructions form the command list and put it in main memory 124. The subpixel coordinates along with their corresponding material and texture parameters are then sent to setup unit 134 from vertex unit 128, which in turn got the information from memory interface 130.

In step 652, setup unit 134 sorts the vertices into top, middle and bottom and determines the long edge of the triangle by identifying the edge of the triangle with the greatest vertical span. As described above, unit 134 identifies the long edge by noting the pair of vertices with the greatest difference in subpixel coordinates for a particular axis. In a preferred embodiment, the long edge is determined along the y-axis, but it is recognized that other axes may be used.

Once the long edge has been determined, unit 134, in step 654, determines the corresponding slope (dy/dx), the characteristic functions and their initial values ($CF_{AI}$ and $CF_{OI}$), and the changes in the values of the characteristic functions for an increment along the slope ($dxy_A$ and $dxy_0$) and for an increment in the direction of an axis ($dx_A$ and $dx_0$). In a preferred embodiment, the direction is along the x-axis, but it is recognized that other axes may be used. Of these values, $CF_{AI}$, $dxy_A$, $dx_A$, $CF_{OI}$, $dxy_0$, $dx_0$, and the initial vertex are passed from the setup unit 134 to edge walker unit 136 in step 656. Edge walker 136 also receives information on the initial material and texture values and their gradients along the long edge and d/dx (i.e., gradients along the x axis for each of these material and texture values).

In step 658, edge walker unit 136 determines a first test subpixel coordinate set from the initial vertex associated with the long edge of the triangle. In a preferred embodiment, the first test coordinate set is that of the vertex. In this way, if a correspondence exists between the vertex and a pixel position, it will be detected immediately. In decision block 660, it is determined whether the test coordinate set resides inside the triangle or along one of the triangle edges. If, as in a preferred embodiment, the initial test coordinate set is equated with that of a vertex, this step is redundant, since by definition the vertex resides on the edge of the triangle. If not, the corresponding adjustments in step 662 are done and the test is made again.

In decision block 664, edge walker 136 determines whether the initial y subpixel coordinate coincides with a pixel position by dividing the y subpixel coordinate by the scale factor integer used in step 650. Decision block 664 is conducted by determining whether the result of the division contains a fractional value, in which case the test subpixel coordinate set does not correspond with a pixel location and process continues at step 666. After incrementing the y subpixel coordinate in step 666, the new test point is tested to determine whether it resides inside the triangle. Accordingly, the process advances to decision block 660. If on the other hand, the result of this division is a whole pixel coordinate for y, then in decision block 668, the same test is performed for the x subpixel coordinate. The method repeatedly conducts step 670 and decision block 668 until the x subpixel coordinate also is divisible by the integer. In step 672, the test coordinate set corresponds with a pixel location and the process continues at step 674.

It is noted that in one embodiment, the corresponding characteristic functions and the material and texture values r, g, b, a, u, v and w are also subjected to the same kind of iterative adjustments. Accordingly, at step 672, the adjusted or interpolated material and texture parameter values are assigned to the first identified pixel.

In step 674, span walker 138 receives the pixel coordinates of the first identified pixel position in the span along with its material and texture values in preparation for iteratively selecting further test points in the span. It is noted that, at this point, the pixel coordinates are adjusted back (i.e., are divided by the integer scale factor). Because span walker 138 receives the pixel coordinates that existed before the command list was formed, the span walker iterates along the span as it would in a conventional method.

In decision block 676, it is determined whether the end of the triangle has been reached. If so the method advances to step 678 and the process is complete. Otherwise, in step 680, the next test pixel along the long edge is obtained. The next test pixel is subjected to decision block 682, wherein it is determined whether the test pixel resides within the triangle. If so, the method proceeds to step 674. Otherwise, the method advances to step 684, in which the nest test pixel lying on the same span, or x axis, is selected. In either case, the method proceeds until the end of the triangle is reached.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a processor and a display screen on which an image of a polygon is generated by lighting selected pixels of the display screen, wherein the selected pixels are positioned in a pixel coordinate system existing at the display screen, a method for simulating motion of the polygon on the display screen comprising the following steps:

tracking the position of the polygon during a period of time in a subpixel coordinate system, the polygon being defined by vertices each having subpixel coordinates and a defined pixel display parameter; and repeatedly, as the position of the polygon changes in the subpixel coordinate system during tee period of time, conducting the following steps:

identifying interior points that are located within or at a boundary of the polygon in the subpixel coordinate system and have subpixel coordinates corresponding to pixels of the display screen;

assigning a pixel display parameter to each identified interior point by an interpolation process conducted with respect to the defined pixel display parameters of the vortices, wherein the interpolation process accounts for differences in position that occur during the time period as measured in the subpixel coordinate system; and lighting the pixels so that each lighted pixel has a display property that is a function of the pixel display parameter assigned to the corresponding interior point.

2. A method as defined in claim 1, wherein the polygon is one of a plurality of adjacent polygons selected to model a three-dimensional object.

3. A method as defined in claim 2, wherein the method further comprises modeling the three-dimensional object by selecting the plurality of polygons such that the vertices of the plurality of polygons lie on the surface of the object.

4. A method as defined in claim 1, wherein the pixel display parameters are selected from the group consisting of r, g, b, a, u, v, and w.

5. A method as defined in claim 1, wherein identifying interior points comprises conducting an iterative process of selecting a series of test points in the subpixel coordinate system.

6. A method as defined in claim 5, wherein the method further comprises creating the subpixel coordinate system by multiplying pixel coordinates defining the position of the vertices of the polygon with an integer scale factor greater than one.

7. A method as defined in claim 6, wherein conducting the iterative process comprises the following steps:

selecting a first test point at a first vertex of the polygon at one end of an edge of the polygon, the first vertex of the polygon having subpixel coordinates $(x_1, y_1)$;

identifying a second vertex of the polygon at the other end of the edge of the polygon, the second vertex having subpixel coordinates $(x_2, y_2)$;

determining whether the subpixel coordinates of the first test point are evenly divisible by the integer scale factor; and in response to a determination that the subpixel coordinates of the first test point are not evenly divisible by the integer scale factor, conducting the following steps:

selecting further test points by a process tat includes incrementing the y-subpixel coordinate of the previous test point by one subpixel unit, such that the y-subpixel coordinate approaches $Y_2$, until the y-subpixel coordinate is evenly divisible by the integer scale factor; and then continuing to select further test points by a process that includes incrementing the x-subpixel coordinate of a previous test point by one subpixel unit, such that the x-subpixel coordinate approaches $x_2$, until the x-subpixel coordinate is evenly divisible by the integer scale factor and the particular test point is located within or on the edge of the polygon.

8. A method as defined in claim 7, wherein the polygon is a triangle.

9. A method as defined in claim 8, further comprising, in order to determine whether each further test point is located within or on the edge of die polygon, the following steps:

determining a first cross product of a first vector extending from the first vertex to the further test point and a second vector extending from the first vertex to a third vertex of the polygon;

determining a second cross product of a third vector extending from the second vertex to he further test point and a fourth vector extending from the second vertex to the third vertex; and determining whether the sum of the magnitude of the first cross product and the magnitude of the second cross product is less than or equal to twice the area.

10. In a system including a processor and a display screen on which an image of a polygon is generated by lighting selected pixels of the display screen, wherein the selected pixels are positioned in a pixel coordinate system existing at the display screen, a computer program product for implementing a method for simulating motion of the polygon on the display screen, the computer program product comprising:

a computer-readable medium carrying computer-executable instructions for implementing the method, wherein the computer-executable instructions comprise:

program code means for tacking the position of the polygon during a period of time in a subpixel coordinate system, the polygon being defined by vertices each having subpixel coordinates and a defined pixel display parameter; and program code means for repeatedly, as the position of the polygon changes in the subpixel coordinate system during the period of time, conducting the following steps:

identifying interior points that are located within or at a boundary of the polygon in the subpixel coordinate system and have subpixel coordinates corresponding to pixels of the display screen;

assigning a pixel display parameter to each identified interior point by an interpolation process conducted with respect to the defined pixel display parameters of the vertices, wherein the interpolation process accounts for differences in position that occur during the time period as measured in the subpixel coordinate system; and lighting the pixels so that each lighted pixel has a display property that is a function of the pixel display parameter assigned to the corresponding interior point.

11. A computer program product as defined in claim 10, wherein the program code means for identifying interior points comprises program code means for iteratively selecting a series of test points in the subpixel coordinate system until the point is identified.

12. A computer program product as defined in claim 11, further comprising program code means for creating the subpixel coordinate system by multiplying pixel coordinates defining the position of the vertices of the polygon with an integer scale factor greater than one.

13. A computer program product as defined in claim 12, wherein the program code means for iteratively selecting a series of test points process comprises:

program code means for selecting a first test point at a first vertex of the polygon at one end of an edge of the polygon, the first vertex of the polygon having subpixel coordinates $(x_1, y_1)$;

program code means for identifying a second vertex of the polygon at the other end of the edge of the polygon, the second vertex having subpixel coordinates $(x_2, y_2)$;

program code means for determining whether the subpixel coordinates of the first test point are evenly divisible by the integer scale factor; and program code means for, in response to a determination that the subpixel coordinates of the first test point arc not evenly divisible by the integer scale factor, conducting the following steps:

selecting further lest points by a process that includes incrementing the y-subpixel coordinate of the previous lost point by one subpixel unit, such that the y-subpixel coordinate approaches $y_2$, until the y-subpixel coordinate is evenly divisible by the integer scale factor; and then continuing to select further test points by a process that includes incrementing the x-subpixel coordinate of a previous test point by one subpixel unit, such that the x-subpixel coordinate approaches $x_2$, until the x-subpixel coordinate is evenly divisible by the integer scale factor and the particular test point is located within or on the edge of the polygon.

14. A computer program product as defined in claim 13, wherein the polygon is a triangle, and wherein, in order to determine whether each further test point is located within or on the edge of the polygon, the computer program product further comprises;

program code mean for determining a first cross product of a first vector extending from the first vertex to the further test point and a second vector extending from the first vertex to a third vertex of the polygon;

program code means for determining a second cross product of a third vector extending from the second vertex to tho further test point and a fourth vector extending from the second vertex to the third vertex; and program code means for determining whether the sum of the magnitude of the first cross product and the magnitude of the second cross product is less than or equal to twice the area.

\* \* \* \* \*

UNITED STATES PATENT AND TRADEMARK OFFICE
CERTIFICATE OF CORRECTION

PATENT NO.   : 6,219,070 B1
DATED        : April 17, 2001
INVENTOR(S)  : Nick Baker, Adam Malamy, Adrian Sfarti, Paul Paternoster and Padma Parthasarathy It is certified that error appears in the above-identified patent and that said Letters Patent is hereby corrected as shown below:

Column 8,
Line 23, after "Polygon" change "300" to -- 300c --
Line 24, before "vertices" insert -- has --

Column 12,
Line 9, after "from" and before "vertex" delete "to"

Column 14,
Line 11, after "order to" change "appropiatedly" to -- appropriately --
Line 17, change "CEIL(-1.5)=-." to -- CEIL(-1.5)=-1. --

Column 16,
Line 20, after "condition," change "i-e.," to -- i.e., --

Column 21,
Line 2, after "during" change "tee" to -- the --
Line 11, after "of the" change "vortices," to -- vertices --
Line 50, after "process" change "tat" to -- that --
Line 53, after "approaches" change "Y2" to -- y2 --
Line 67, after "edge of" change "die" to -- the --

Column 23,
Line 5, after "test point" change "arc" to -- are --
Line 8, after "further" change "lest" to -- test --
Line 10, after "previous" change "lost" to -- test --

UNITED STATES PATENT AND TRADEMARK OFFICE
CERTIFICATE OF CORRECTION

PATENT NO. : 6,219,070 B1
DATED : April 17, 2001
INVENTOR(S) : Nick Baker, Adam Malamy, Adrian Sfarti, Paul Paternoster and Padma Parthasarathy It is certified that error appears in the above-identified patent and that said Letters Patent is hereby corrected as shown below:

<u>Column 24,</u>
Line 6, after "code" change "mean" to -- means --
Line 12, after "vertex to" change "tho" to -- the --

Signed and Sealed this

Twenty-eighth Day of May, 2002

Attest:

*Attesting Officer*

JAMES E. ROGAN
*Director of the United States Patent and Trademark Office*